United States Patent
Mitsunobu et al.

(10) Patent No.: US 8,379,663 B2
(45) Date of Patent: Feb. 19, 2013

(54) TIME SLOT ALLOCATION METHOD AND APPARATUS

(75) Inventors: Hideki Mitsunobu, Kawasaki (JP); Toshihiko Kurita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 282 days.

(21) Appl. No.: 12/917,607

(22) Filed: Nov. 2, 2010

(65) Prior Publication Data

US 2011/0103398 A1    May 5, 2011

(30) Foreign Application Priority Data

Nov. 5, 2009    (JP) ................................. 2009-253761

(51) Int. Cl.
*H04L 12/43* (2006.01)
(52) U.S. Cl. .................... 370/458; 370/294; 370/314
(58) Field of Classification Search ........................ None
See application file for complete search history.

(56) References Cited

U.S. PATENT DOCUMENTS

| | | | | |
|---|---|---|---|---|
| 5,502,714 A * | 3/1996 | Sallberg | ........................ | 370/351 |
| 6,661,806 B1 * | 12/2003 | Eriksson et al. | ............. | 370/468 |
| 6,731,628 B1 * | 5/2004 | Shiomoto et al. | ............ | 370/355 |
| 7,206,320 B2 * | 4/2007 | Iwamura | ........................ | 370/448 |
| 2002/0006173 A1 * | 1/2002 | Agazzi et al. | ................ | 375/340 |
| 2004/0252714 A1 * | 12/2004 | Oh et al. | ........................ | 370/437 |
| 2006/0153130 A1 * | 7/2006 | Laroia et al. | ................... | 370/329 |
| 2007/0160072 A1 * | 7/2007 | Thalanany et al. | ........... | 370/401 |
| 2009/0232029 A1 * | 9/2009 | Abu-Hamdeh et al. | ........ | 370/255 |
| 2010/0161885 A1 * | 6/2010 | Kanno et al. | .................. | 711/103 |
| 2010/0176926 A1 * | 7/2010 | Jo et al. | ........................ | 340/10.2 |

FOREIGN PATENT DOCUMENTS

WO    WO-02/32049    4/2002

* cited by examiner

*Primary Examiner* — Hassan Kizou
*Assistant Examiner* — Jamaal Henson
(74) *Attorney, Agent, or Firm* — Fujitsu Patent Center

(57) ABSTRACT

This method includes: judging, for each certain combination of the source and destination nodes, for which the number of time slots to be allocated is equal to or greater than 1, whether or not certain time slots exist that are capable of forming a route from the source node to the destination node by unused links; for each certain combination judged, at the judging, that the certain time slots exist that are capable of forming the route by the unused links, identifying, for each certain time slot, a shortest route among routes formed by the unused links, calculating an evaluation value from the number of hops in the shorted route, an allocated priority associated with a corresponding certain combination and the number of used links in the corresponding certain time slot; and identifying a maximum evaluation value among the evaluation values.

8 Claims, 22 Drawing Sheets

| SOURCE \ DESTINATION | 0 | 1 | 2 | 3 |
|---|---|---|---|---|
| 0 | | 0 | 10 | 5 |
| 1 | 0 | | 5 | 10 |
| 2 | 0 | 10 | | 0 |
| 3 | 0 | 0 | 0 | |

FIG.4

| SOURCE \ DESTINATION | 0 | 1 | 2 | 3 |
|---|---|---|---|---|
| 0 | | 1 | 1 | 3 |
| 1 | — | | 5 | 4 |
| 2 | — | 3 | | 2 |
| 3 | — | — | — | |

FIG.7

| src | dst | SLOT 0 | SLOT 1 | ... | SLOT n |
|---|---|---|---|---|---|
| 0 | 4 | 0 | 0 | | 0 |
| 4 | 0 | 0 | 0 | | 0 |
| 4 | 6 | 0 | 0 | | 0 |
| 6 | 4 | 0 | 0 | | 0 |
| 2 | 6 | 0 | 0 | | 0 |
| 6 | 2 | 0 | 0 | | 0 |
| 4 | 5 | 0 | 0 | | 0 |
| 5 | 4 | 0 | 0 | | 0 |
| 4 | 7 | 0 | 0 | | 0 |
| 7 | 4 | 0 | 0 | | 0 |
| 5 | 6 | 0 | 0 | | 0 |
| 6 | 5 | 0 | 0 | | 0 |
| 5 | 7 | 0 | 0 | | 0 |
| 7 | 5 | 0 | 0 | | 0 |
| 6 | 7 | 0 | 0 | | 0 |
| 7 | 6 | 0 | 0 | | 0 |
| 1 | 5 | 0 | 0 | | 0 |
| 5 | 1 | 0 | 0 | | 0 |
| 7 | 3 | 0 | 0 | | 0 |
| 3 | 7 | 0 | 0 | | 0 |

| SOURCE NODE | DESTINATION NODE | SLOT NO. | ROUTE | EVALUATION VALUE |
|---|---|---|---|---|
| 0 | 2 | 0 | 0→4→6→2 | 3 |
| 1 | 3 | 0 | 1→5→7→3 | 1.5 |
| 2 | 1 | 0 | 2→6→5→1 | 1 |
| ... | ... | ... | ... | ... |

FIG.12

| SOURCE NODE | DESTINATION NODE | SLOT NO. | ROUTE |
|---|---|---|---|
| 0 | 2 | 0 | 0→4→6→2 |
| 0 | 2 | 1 | 0→4→6→2 |
| 0 | 3 | 2 | 0→4→7→3 |
| 1 | 2 | 2 | 1→5→6→2 |
| 1 | 3 | 0 | 1→5→7→3 |
| 1 | 3 | 1 | 1→5→7→3 |
| 2 | 1 | 0 | 2→6→5→1 |
| 2 | 1 | 1 | 2→6→5→1 |

FIG.13

|     | dst |   |   |   |   |   |   |   |
|-----|---|---|---|---|---|---|---|---|
|     | 0 | 1 | 2 | 3 | 4 | 5 | 6 | 7 |
| src 0 | 0 | 0 | 0 | 0 | 1 | 0 | 0 | 0 |
| 1 | 0 | 0 | 0 | 0 | 0 | 1 | 0 | 0 |
| 2 | 0 | 0 | 0 | 0 | 0 | 0 | 1 | 0 |
| 3 | 0 | 0 | 0 | 0 | 0 | 0 | 0 | 1 |
| 4 | 1 | 0 | 0 | 0 | 0 | 1 | 1 | 1 |
| 5 | 0 | 1 | 0 | 0 | 1 | 0 | 1 | 1 |
| 6 | 0 | 0 | 1 | 0 | 1 | 1 | 0 | 1 |
| 7 | 0 | 0 | 0 | 1 | 1 | 1 | 1 | 0 |

FIG.15

| src | dst | SLOT 0 | SLOT 1 | ... | SLOT n |
|---|---|---|---|---|---|
| 0 | 4 | 1 | 0 | | 0 |
| 4 | 0 | 0 | 0 | | 0 |
| 4 | 6 | 1 | 0 | | 0 |
| 6 | 4 | 0 | 0 | | 0 |
| 2 | 6 | 0 | 0 | | 0 |
| 6 | 2 | 1 | 0 | | 0 |
| 4 | 5 | 0 | 0 | | 0 |
| 5 | 4 | 0 | 0 | | 0 |
| 4 | 7 | 0 | 0 | | 0 |
| 7 | 4 | 0 | 0 | | 0 |
| 5 | 6 | 0 | 0 | | 0 |
| 6 | 5 | 0 | 0 | | 0 |
| 5 | 7 | 0 | 0 | | 0 |
| 7 | 5 | 0 | 0 | | 0 |
| 6 | 7 | 0 | 0 | | 0 |
| 7 | 6 | 0 | 0 | | 0 |
| 1 | 5 | 0 | 0 | | 0 |
| 5 | 1 | 0 | 0 | | 0 |
| 7 | 3 | 0 | 0 | | 0 |
| 3 | 7 | 0 | 0 | | 0 |

FIG.19

TIME SLOT ALLOCATION METHOD AND APPARATUS

CROSS-REFERENCE TO RELATED APPLICATIONS

This application is based upon and claims the benefit of priority of the prior Japanese Patent Application No. 2009-253761, filed on Nov. 5, 2009, the entire contents of which are incorporated herein by reference.

FIELD

This technique relates to a technique in a field in which data transfer is carried out in time division through a wired network.

BACKGROUND

For example, Time Division Multiplexing (TDM) and the like are known as a technique for carrying out data transfer in time division. In TDM, one time frame is divided into plural time slots, and data transfer is independently carried out for each time slot.

Incidentally, in case where data transfer is carried out for each time slot, the number of time slots also increases when the number of routes increases. However, in order to provide a lot of time slots, one time frame is sectioned much finely. Accordingly, the bandwidth per one route becomes narrower.

Moreover, conventional arts cannot allocate the time slots to data transfer routes in appropriate order in the wired network, and are not always efficient.

SUMMARY

This time slot allocation method is a method executed by a computer, which is capable of accessing a slot information storage device storing, for each combination of a source node and a destination node in a network, a number of time slots to be allocated to packet transmission from the source node to the destination node, a priority storage device storing, for each combination, an allocation priority, a link information storage device storing, for each time slot, utilization states of links between nodes in the network, an allocation information storage device and a storage device. Then, the time slot allocation method includes: (A) judging, for each certain combination of the source node and the destination node, for which the number of time slots stored in the slot information storage device is equal to or greater than 1, whether or not certain time slots exist that are capable of forming a route from the source node to the destination node by unused links for which the utilization state represents being unused in the link information storage device among the links between the nodes; (B) for each certain combination judged, at the judging, that the certain time slots exist that are capable of forming the route by the unused links, identifying, for each certain time slot, a shortest route among routes formed by the unused links, calculating an evaluation value by applying to a predetermined evaluation function, the number of hops in the shortest route, the allocated priority stored in association with a corresponding certain combination in the priority storage device and the number of links whose utilization state represents being used during a corresponding certain time slot in the link information storage device, and storing the calculated evaluation value into the storage device in association with the source node, the destination node, the shortest route and an identifier of the certain time slot; and (C) identifying a maximum evaluation value among the calculated evaluation values stored in the storage device, and storing into the allocation information storage device, slot allocation information including the source node, the destination node, the shortest route and the identifier of the certain time slot, which are stored in the storage device in association with the maximum evaluation value.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 4 is a diagram depicting an example of data stored in a bandwidth information storage;

FIG. 7 is a diagram depicting an example of data stored in a priority storage;

FIG. 12 is a diagram depicting an example of data stored in an evaluation value storage;

FIG. 13 is a diagram depicting an example of data stored in an allocation information storage;

FIG. 15 is a diagram depicting an example of an adjacency matrix;

FIG. 19 is a diagram depicting an example of data stored in the link information storage;

DESCRIPTION OF EMBODIMENTS

Figure 1:
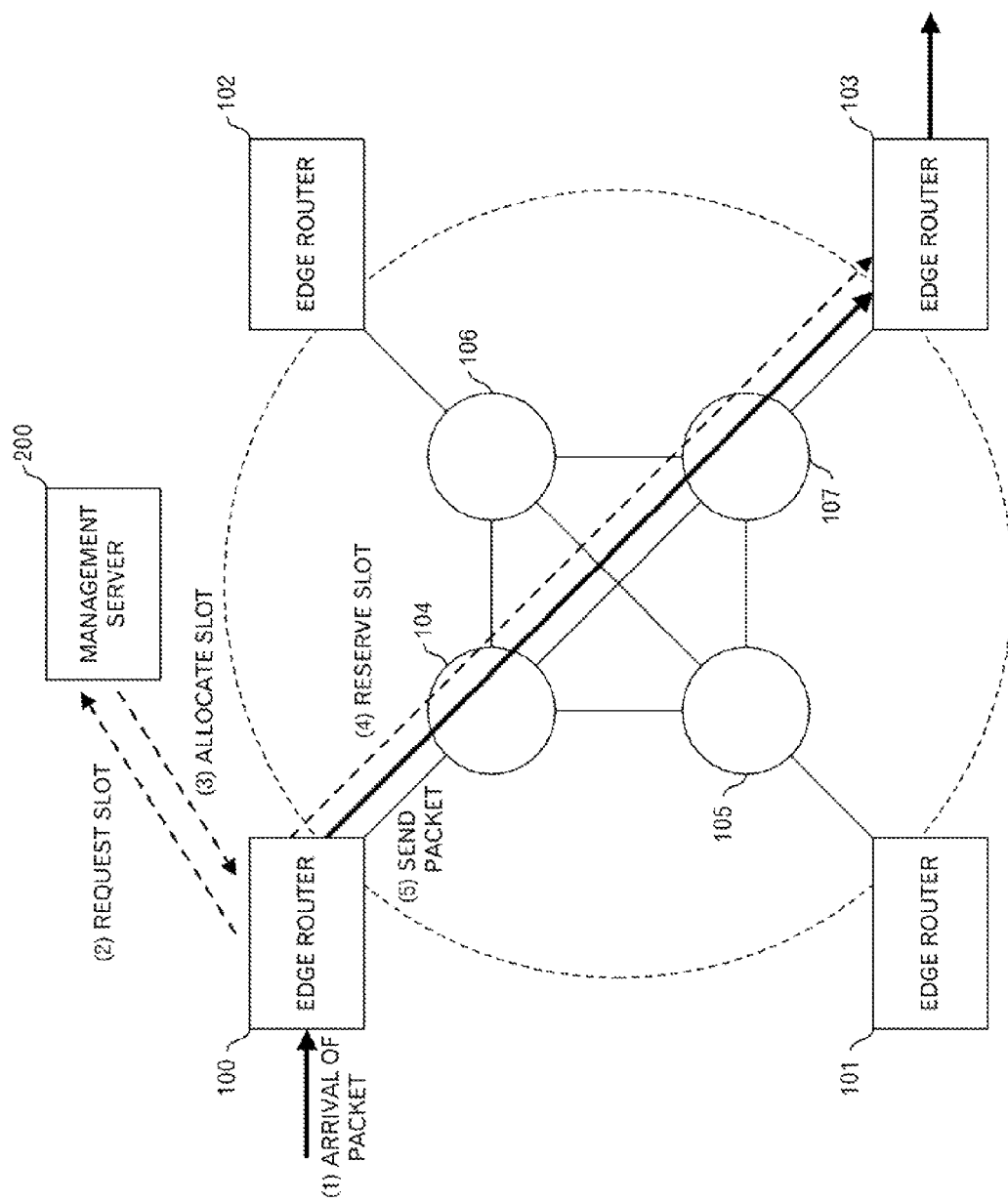
FIG. 1 is a diagram to explain a time division data transfer method relating to a basis of an embodiment of this technique.

First, by using FIGS. 1 and 2, a time division data transfer method relating to a basis of this embodiment will be explained, briefly. For example, explanation is carried out while assuming a network as depicted in FIG. 1. In FIG. 1, a router 104 is connected to routers 105, 106 and 107, the router 105 is connected to the routers 106 and 107, and the router 106 is connected to the router 107. Furthermore, the router 104 is connected to an edge router 100, the router 105 is connected to an edge router 101, the router 106 is connected to an edge router 102, and the router 107 is connected to the edge router 103. Incidentally, each of the edge routers 100 to 103 is connected to an outside network. In addition, a management server 200, which carries out a main processing in this embodiment, is connected to each of the edge routers through control lines. Incidentally, in this embodiment, the routers 104 to 107, which are not connected to the outside network, may be called as "a relay router". Moreover, the edge routers and relay routers may be called as "nodes". Incidentally, this network depicted in FIG. 1 is a mere example of a simple network. Therefore, this embodiment is not limited to such a network configuration.

For example, when a packet reaches the edge router 100 from an outside network (FIG. 1: step (1)), the edge router 100 sends a slot allocation request to the management server 200 (step (2)). For example, this slot allocation request includes designation of a source edge router and a destination edge router. Incidentally, in this embodiment, the source edge router is called as "source node", and the destination edge router is called as "destination node". Here, it is assumed that the edge router 100 is designated as the source node, and the edge router 103 is designated as the destination node.

Then, when the management server 200 receives the slot allocation request including the designation of the source node and destination node from the edge router 100, the management server 200 sends a slot number of a time slot (hereinafter, which may be referred to "slot", simply), which has been allocated in advance to the packet transmission from the designated source node to the destination node (step (3)). At this time, route information from the source node to the destination node is also sent. Incidentally, the management server 200 determines, for each combination of the source node and destination node, what time slot is used, in advance. Here, it is assumed that a slot "2" is allocated to the packet transmission from the edge router 100 to the edge router 103.

Then, when the edge router 100 receives the slot number (i.e. "2") and the route information from the management server 200, the edge router 100 sends a control packet (also called as a "reservation packet") for reserving the slot "2" during the slot "2" immediately after the receipt of the information from the management server 200, according to the route information (step (4)). By sending this reservation packet, it is informed to the relay routers on the route (in FIG. 1, the routers 104 and 107) that the packet transmission from the edge router 100 to the edge router 103 is carried out in the slot "2".

Then, in the subsequent slot "2", the packet transmission is carried out from the edge router 100 to the edge router 103 (step (5)). For example, when the packet transmission is carried out through a route "edge router 100 ->router 104->router 107->edge router 103", when the router 104 receives a packet from the edge router 100 in the slot "2", the router 104 transfers the packet to the router 107 without any conventional routing processing. Similarly, in the slot "2", when the router 107 receives the packet from the router 104, the router 107 transfers the packet to the edge router 103 without any conventional routing processing.

Figure 2:
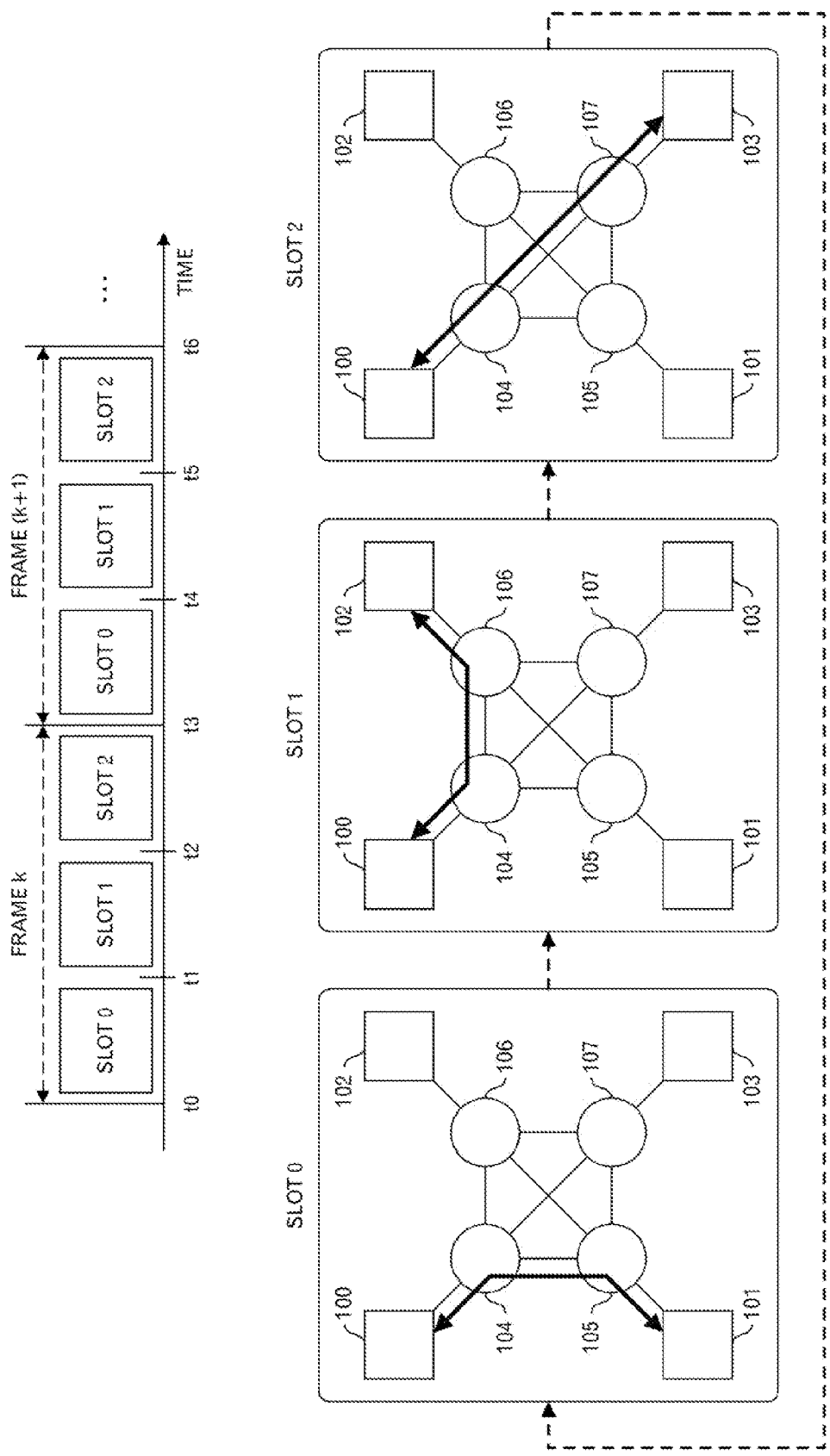
FIG. 2 is a diagram depicting an example in case where one frame is divided into tree sections in the time division data transfer method.

For example, FIG. 2 depicts an example in case where one frame is divided into three time slots. In an example of FIG. 2, in slot "0" (on a time axis of FIG. 2, t0-t1, t3-t4, ...) the packet communication is carried out between the edge router 100 and the edge router 101, in slot "1" (on the time axis of FIG. 2, t1-t2, t4-t5, ...), the packet communication is carried out between the edge router 100 and the edge router 102, and in slot "2" (on the time axis of FIG. 2, t2-t3, t5-t6, ...), the packet communication is carried out between the edge router 101 and the edge router 103. FIG. 2 depicts an example where there are three routes used for the packet communication, and when there are other routes to be used for the packet communication, one frame is sectioned into four or more time slots.

According to such time division data transfer method, the relay router does not carry out packet buffering and routing table retrieving processing. Therefore, it is possible to reduce the power consumed for the packet buffering and routing table retrieving processing, and power saving in the relay router is realized.

However, for example, when the scale of the network becomes large, more time slots are used, because the number of routes used for the packet communication increases. However, in order to provide more time slots, one frame is divided much finely. Accordingly, the bandwidth per one route becomes narrower. Then, by carrying out a processing in the management server 200, which will be explained later, this embodiment enables a lot of routes used for the packet communication to be handled by few time slots as much as possible. In the following, the management server 200 relating to this embodiment will be explained.

Figure 3:
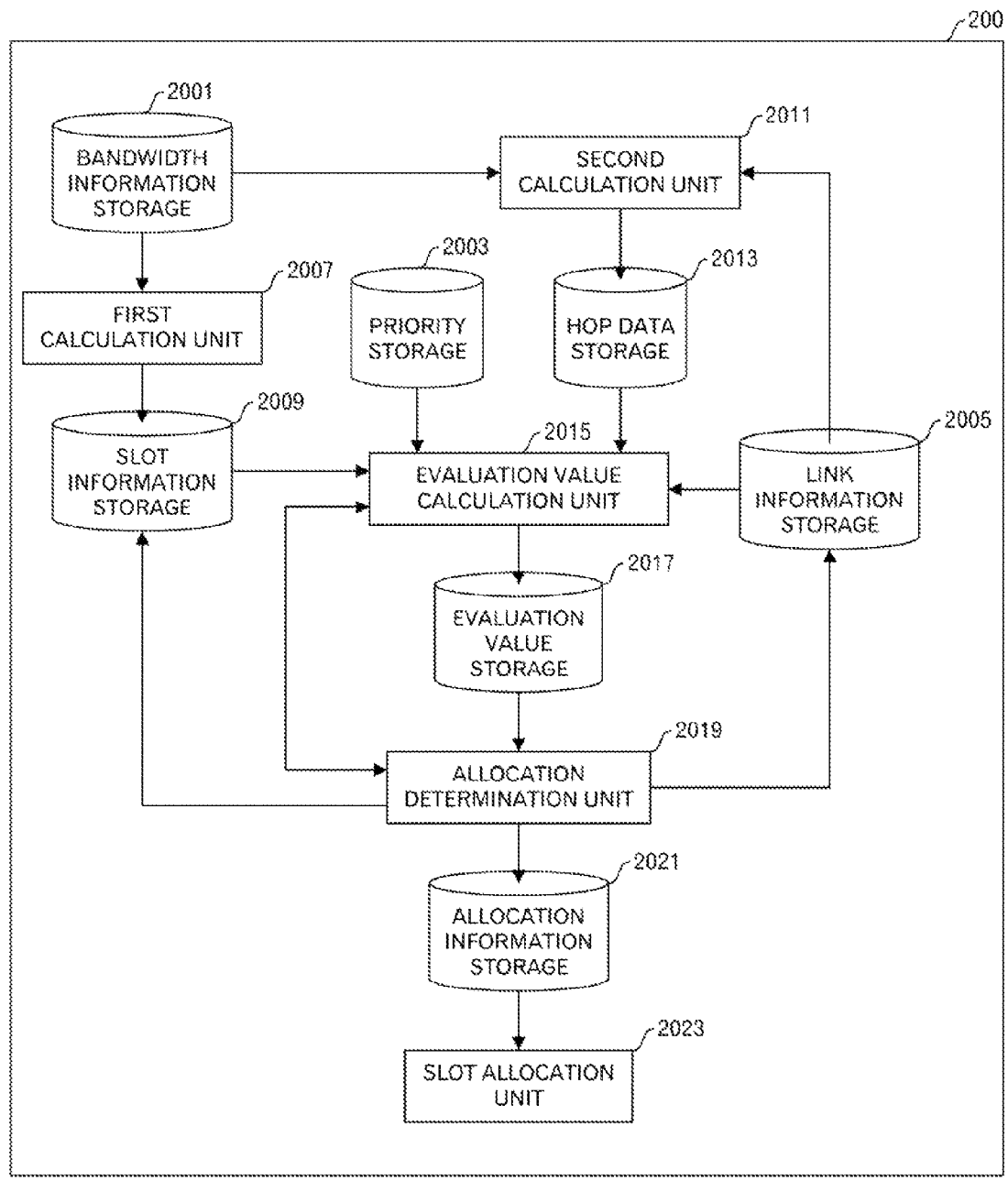
FIG. 3 is a functional block diagram of a management server in this embodiment.

FIG. 3 depicts a functional block diagram of the management server 200. The management server 200 has a bandwidth information storage 2001, a priority storage 2003, a link information storage 2005, a first calculation unit 2007, a slot information storage 2009, a second calculation unit 2011, a hop data storage 2013, an evaluation value calculation unit 2015, an evaluation value storage 2017, an allocation determination unit 2019, an allocation information storage 2021 and a slot allocation unit 2023.

Incidentally, the first calculation unit 2007 calculates the number of time slots to be allocated to the packet transmission from the source node to the destination node, based on data stored in the bandwidth information storage 2001, for each combination of the source node and the destination node. The second calculation unit 2011 calculates the minimum number of hops in routes from the source node to the destination node based on data stored in the bandwidth information storage 2001 and the link information storage 2005, and stores the calculated data into the hop data storage 2013. The evaluation value calculation unit 2015 calculates an evaluation value described later based on data stored in the priority storage 2003, the link information storage 2005, the slot information storage 2009 and the hop data storage 2013, and stores the calculated value into the evaluation value storage 2017. In addition, after the evaluation value is calculated, the evaluation value calculation unit 2015 instructs the allocation determination unit 2019 to identify the maximum evaluation value. The allocation determination unit 2019 identifies the maximum evaluation value among the evaluation values stored in the evaluation value storage 2017 in response to the instruction from the evaluation value calculation unit 2015, generates slot allocation information including the source node, the destination node, a slot number and route information, and stores the slot allocation information into the allocation information storage 2021. In addition, the allocation determination unit 2019 updates data stored in the link information storage 2005 and the slot information storage 2009, and if there is a route to which the slot is allocated, the allocation determination unit 2019 instructs the evaluation value calculation unit 2015 to calculate the evaluation value again. When the slot allocation request is received from the edge router, the slot allocation unit 2023 obtains the slot allocation information corresponding to the source node and the destination node, which are designated in the slot allocation request, and sends the slot allocation information to the edge router.

Figure 5:
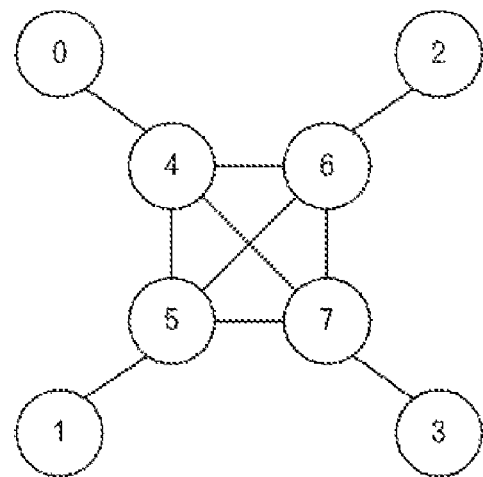
FIG. 5 is a diagram in a case where a network configuration depicted in FIG. 1 is represented by node numbers.

FIG. 4 depicts an example of data stored in the bandwidth information storage 2001. In an example of FIG. 4, the bandwidth information storage 2001 stores, for each combination of the source node and the destination node, information of communication bandwidth (unit: Mbps (Mega bit per second)) for the packet transmission from the source node to the destination node, in advance. Incidentally, in order to make the following explanation easy, it is assumed that the node number of the edge router 100 is "0", the node number of the edge router 101 is "1", the number of the edge router 102 is "2", and the node number of the edge router 103 is "3". In addition, it is assumed that the node number of the router 104 is "4", the node number of the router 105 is "5", the node number of the router 106 is "6", and the node number of the router 107 is "7". Therefore, when the network configuration depicted in FIG. 1 is represented by using the node numbers, FIG. 5 is obtained.

For example, FIG. 4 represents the packet transmission from the node "0" to the node "2" by 10 Mbps. In addition, FIG. 4 represents the packet transmission from the node "0" to the node "3" by 5 Mbps.

Figure 6:
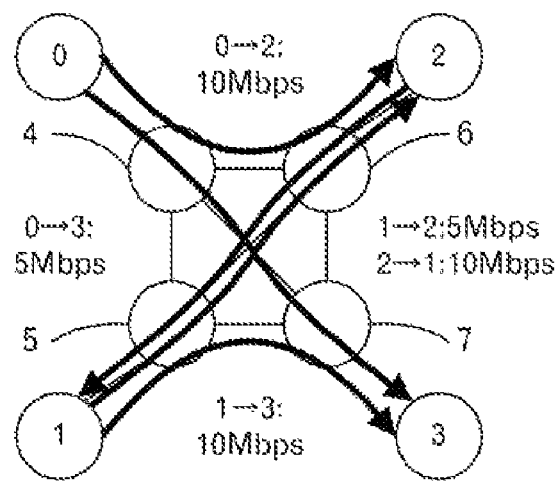
FIG. 6 is a diagram visualizing a flow of the packet transmission.

Furthermore, FIG. 4 represents the packet transmission from the node "1" to the node "2" by 5 Mbps. Moreover, FIG. 4 represents the packet transmission from the node "1" to the node "3" by 10 Mbps. Furthermore, FIG. 4 represents the packet transmission from the node "2" to the node "1" by 10 Mbps. Incidentally, as for combinations that no packet transmission is carried out among the combinations of the source node and the destination node, "0" is set to the communication bandwidth. Namely, FIG. 4 represents no packet transmission is carried out, for example, from the node "0" to the node "1". Incidentally, when the contents depicted in FIG. 4 are depicted to make it easy to see, FIG. 6 is obtained. Arrows in FIG. 6 represent the packet transmission is carried out. Thus, in this embodiment, information concerning how much communication bandwidth is provided to the packet transmission between the source node and the destination node is given in advance, and stored in the bandwidth information storage 2001 of the management server 200.

FIG. 7 depicts an example of data stored in the priority storage 2003. In an example of FIG. 7, the priority storage 2003 stores, for each combination of the source node and the destination node, allocation priority. Incidentally, in FIG. 7, the lesser the value is, the higher the allocation priority is. Namely, in FIG. 7, the allocation priority (=1) for the source node "0" and the destination node "2" is the highest, and the allocation priority (=5) for the source node "1" and the destination node "2" is the lowest. In this embodiment, the wider the communication bandwidth stored in the bandwidth information storage 2001 is, the higher the allocation priority is set into the priority storage 2003. Incidentally, for the combination for which "0" is set in the bandwidth information storage 2001, "–" is set in the priority storage 2003.

Figures 8, 9:
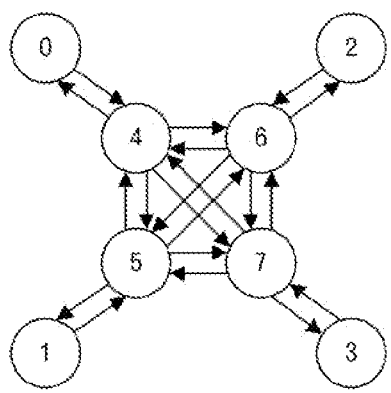
FIG. 8 is a diagram depicting an example of data stored in a link information storage.
FIG. 9 is a diagram in case where uplinks and downlinks are separately represented.

FIG. 8 depicts an example of data stored in the link information storage 2005. In an example of FIG. 8, a utilization state of the uplink and a utilization state of the downlink are separately managed. For example, in FIG. 5, the uplink and downlink are collectively represented by one line. When there are separately depicted, FIG. 9 is obtained. Namely, the records are stored in the link information storage 2005 by the number (=20) of arrows in FIG. 9. Furthermore, in an example of FIG. 9, the link information storage 2005 includes a column of a node number (src) of a starting node among the node at both edges of the link, a column of a node number (dst) of an ending point among the nodes at both edges of the link, a column of slot 0, a column of slot 1, ... and a column of slot n. Incidentally, each column of the slots 0 to n, "1" is set for the link being used in the slot, and "0" is set for the link being unused in the slot.

Figure 10:
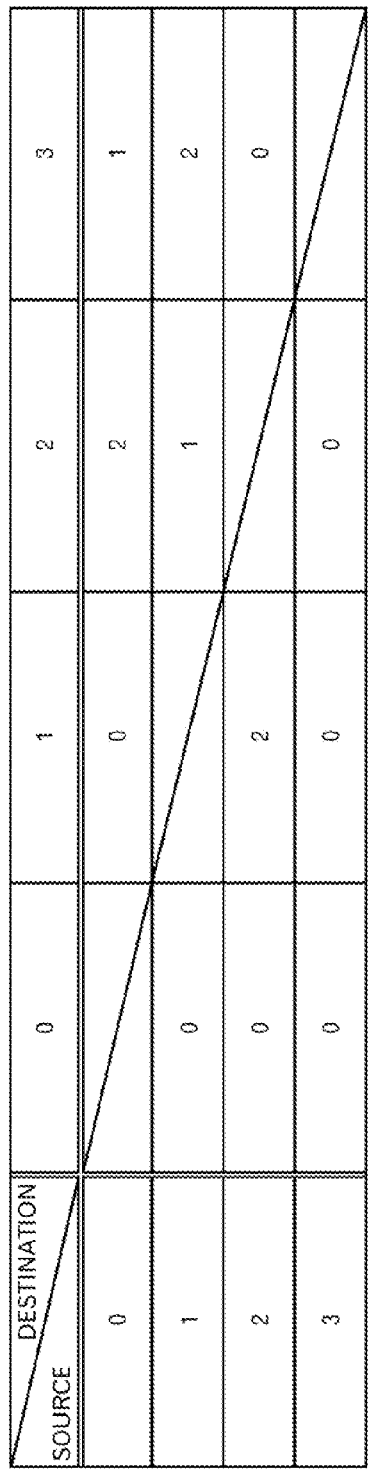
FIG. 10 is a diagram depicting an example of data stored in a slot information storage.

FIG. 10 depicts an example of data stored in the slot information storage 2009. In an example of FIG. 10, the slot information storage 2009 stores, for each combination of the source node and the destination node, the number of time slots (i.e. the number of slots) to be allocated to the packet transmission from the source node to the destination node. For example, FIG. 10 represents two time slots have to be allocated to the packet transmission from the node "0" to the node "2". In addition, FIG. 10 represents one time slot has to be allocated to the packet transmission from the node "0" to the node "3". Furthermore, FIG. 10 represents one time slot has to be allocated to the packet transmission from the node "1" to the node "2". In addition, FIG. 10 represents two time slots have to be allocated to the packet transmission from the node "1" to the node "3". Furthermore, FIG. 10 represents two time slots have to be allocated to the packet transmission from the node "2" to the node "1". Incidentally, although the detailed explanation will be made later, the number of slots are calculated based on the data stored in the bandwidth information storage 2001, and set to the slot information storage 2009.

Figure 11:
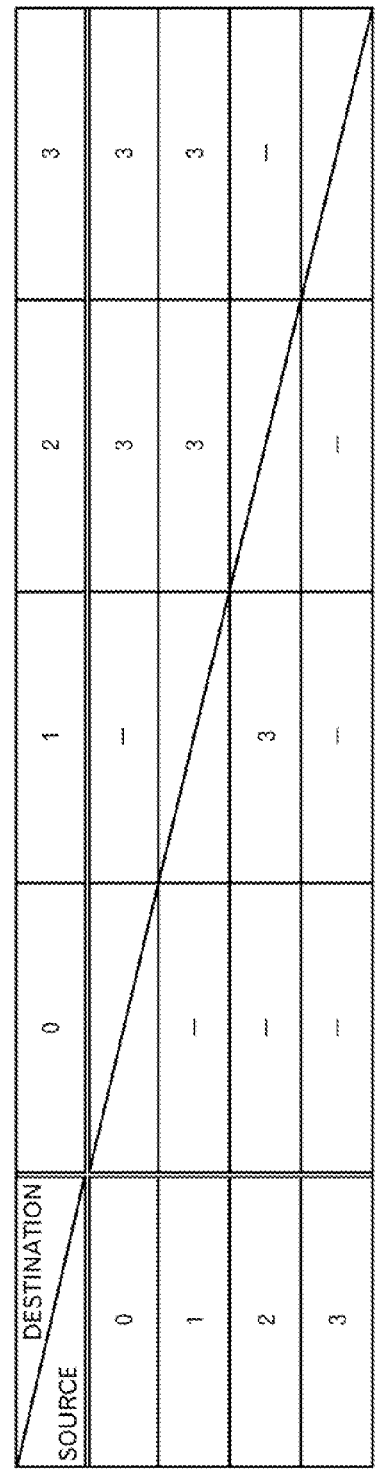
FIG. 11 is a diagram depicting an example of data stored in a hop data storage.

FIG. 11 depicts an example of data stored in the hop data storage 2013. In an example of FIG. 11, the hop data storage 2013 stores, for each combination of the source node and the destination node, the minimum number of hops in the routers from the source node to the destination node. Incidentally, the minimum number of hops is calculated, for example, by Dijkstra's algorithm or the like, and set into the hop data storage 2013. In addition, as for the combination for which "0" is set in the bandwidth information storage 2001, "–" is set in the hop data storage 2013.

FIG. 12 depicts an example of data stored in the evaluation value storage 2017. In an example of FIG. 12, the evaluation value storage 2017 includes a column of the source node, a column of the destination node, a column of the slot number, a column of the route and a column of the evaluation value. Namely, the evaluation value calculated by the evaluation value calculation unit 2015 and the source node, destination node, slot number and route, which relate to the evaluation value, are stored into the evaluation value storage 2017.

FIG. 13 depicts an example of data stored in the allocation information storage 2021. In an example of FIG. 13, the allocation information storage 2021 includes a column of the source node, a column of the destination node, a column of the slot number and a column of the route. Namely, the allocation information storage 2021 stores the slot number allocated to the packet transmission from the source node to the destination node and the route from the source node to the destination node. Incidentally, when the slot allocation unit 2023 receives the slot allocation request from the edge router, the slot allocation unit 2023 obtains the slot number and the route information, which correspond to the source node and the destination node, which are designated by the slot allocation request, from the allocation information storage 2021, and sends the slot number and the route information to the edge router.

Figure 14:
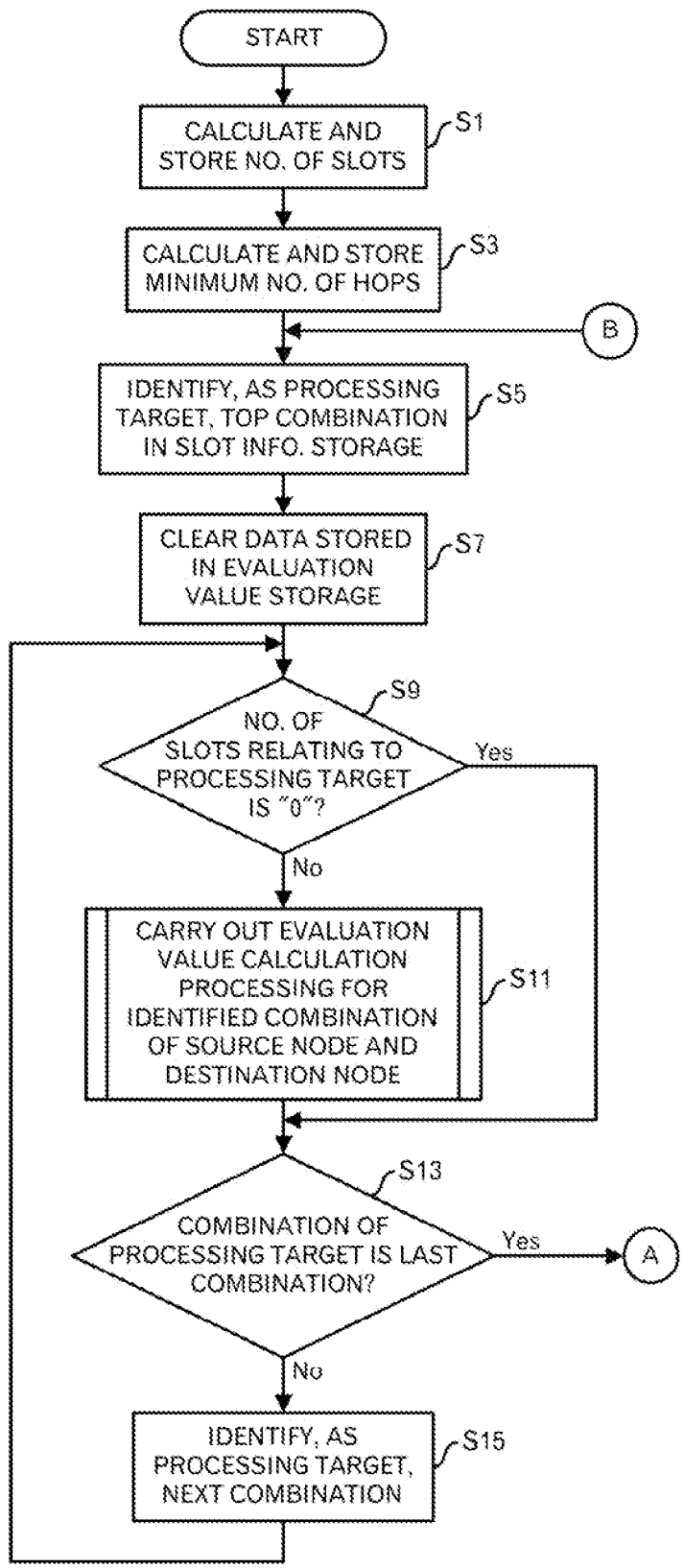
FIG. 14 is a diagram depicting a first portion of a processing when the time slot allocation is carried out.

Next, processing contents of the management server 200 will be explained by using FIGS. 14 to 21. Incidentally, it is assumed that data as depicted in FIG. 4 is stored in the bandwidth information storage 2001, and data depicted in FIG. 7 is stored in the priority storage 2003. In addition, records depicted in FIG. 8 are stored in the link information storage 2005, and the values in the respective columns from the slot 0 to the slot n are entirely initialized to First, the first calculation unit 2007 calculates, for each combination of the source node and the destination node, the number of time slots to be allocated to the packet transmission from the source node to the destination node based on the data stored in the bandwidth information storage 2001 (FIG. 14: step S1). Specifically, the first calculation unit 2007 calculates the greatest common divider of the communication bandwidths stored in the bandwidth information storage 2001, and calculates, for each combination of the source node and the destination node, the number of slots by dividing the communication bandwidth corresponding to the combination by the greatest common divider. For example, in case where the data as depicted in FIG. 4 is stored in the bandwidth information storage 2001, the greatest common divider is "5" (Mbps), and when the communication bandwidth is 10 Mbps, the number of slots is 2 (=10/5). In addition, when the communication bandwidth is 5 Mbps, the number of slots is 1 (=5/5). Incidentally, when the communication bandwidth is "0", the number of slots is also "0". Therefore, when the processing of this step is carried out, data as depicted in FIG. 10 is stored in the slot information storage 2009. Thus, because the number of slots can be determined based on the greatest common divider, it becomes possible to allocate the time slots with less waste. Incidentally, a period of one slot is determined based on the bandwidth of one slot and the actual physical bandwidth. In the aforementioned example, when the physical bandwidth is 10 Mbps, the period per one slot is 0.5 second, and when the physical bandwidth is 5 Mbps, the period per one slot is 1 second.

Then, the second calculation unit 2011 calculates, for each combination of the source node and the destination node, the minimum number of hops in the route from the source node to the destination node, based on data stored in the bandwidth information storage 2001 and the link information storage 2005, and stores the calculated data into the hop data storage 2013 (step S3). Specifically, the second calculation unit 2011 identifies, for each combination of the source node and the destination node, the shortest route from the source node to the destination node, by using an adjacency matrix generated from data stored in the link information storage 2005 according to the Dijkstra's algorithm, and calculates, as the minimum number of hops, the number of hops in the shortest route. Incidentally, as for the combinations of the source node and the destination node, for which "0" is set in the bandwidth information storage 2001, the minimum number of hops may not be calculated. For example, when the data depicted in FIG. 8 is stored in the link information storage 2005, the adjacency matrix as depicted in FIG. 15 is generated. For example, when the starting node (src) is the node x, the ending node (dst) is the node y, "1" is set to an element (x, y) in the adjacency matrix when any link between the nodes x and y exists. On the other hand, when there is no link between the nodes x and y, "0" is set to the element (x, y) in the adjacency matrix. For example, in FIG. 8, because a link from the node "0" to the node "4" exists, "1" is set to an element (0, 4) in the adjacency matrix depicted in FIG. 15. Incidentally, the processing itself to identify the shortest distance by the Dijkstra's algorithm is conventional. Therefore, the detailed explanation is omitted. In addition, the order of the steps S1 and S3 can be replaced, and they can be executed in parallel.

After that, the evaluation value calculation unit 2015 identifies, as a processing target, a top combination among combinations of the source node and the destination node in the slot information storage 2009 (step S5). Here, it is assumed that the processing order is determined in advance. For example, in the slot information storage 2009 of FIG. 10, when a processing is carried out in ascending order of the node number of the source node, the processing is carried out in an order of the combination of the source node "0" and the destination node "1", the combination of the source node "0" and the destination node "2", the combination of the source node "0" and the destination node "3", the combination of the source node "1" and the destination node "0", . . . , the combination of the source node "3" and the destination node "1", and the combination of the source node "3" and the destination node "2". In this case, the combination of the source node "0" and the destination node "1" is the top combination, and is identified as the processing target at the step S5. In addition, the evaluation value calculation unit 2015 clears data stored in the evaluation value storage 2017 (step S7). Incidentally, when data is not stored in the evaluation value storage 2017, this step may be skipped. In addition, the processing order of the steps S5 and S7 can be replaced and they can be executed in parallel.

Then, the evaluation value calculation unit 2015 judges whether or not the number of slots for the combination to be processed, is "0" in the slot information storage 2009 (step S9). When, in the slot information storage 2009, the number of slots for the combination to be processed is "0" (step S9: Yes route), an evaluation value calculation processing (step S11), which will be explained later, is skipped, and the processing shifts to step S13. Incidentally, when the number of slots is "0", the slot allocation is not required.

On the other hand, when the number of slots for the combination to be processed is equal to "1" or greater than "1" (step S9: No route), the evaluation value calculation unit 2015 carry out an evaluation value calculation processing for the combination to be processed, by using data stored in the priority storage 2003, the link information storage 2005, slot information storage 2009 and the hop data storage 2013 (step S11). Incidentally, the evaluation value calculation processing will be explained by using FIGS. 16 and 17.

Figure 16:
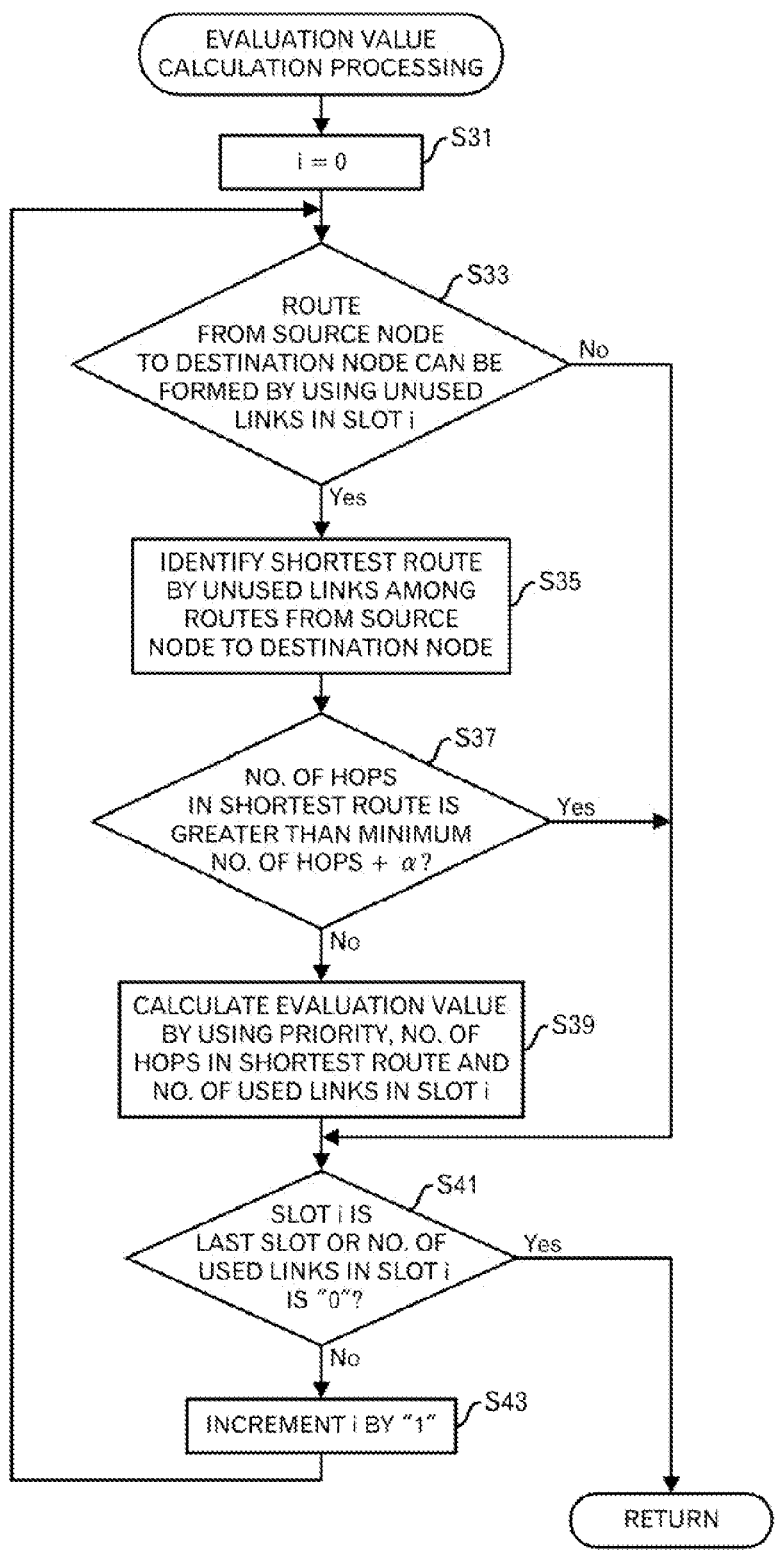
FIG. 16 is a diagram depicting a processing flow of an evaluation value calculation processing.

First, the evaluation value calculation unit 2015 sets "0" to a variable "i" (FIG. 16: step S31). Incidentally, in the following processing, "i" represents the slot number. Then, the evaluation value calculation unit 2015 judges whether or not a route from the source node to the destination node can be formed by using unused links in the slot "i" based on data stored in the link information storage 2005 (step S33). When the route from the source node to the destination node cannot be formed by using the unused links in the slot "i" (step S33: No route), the evaluation value calculation unit 2015 judges that the slot "i" cannot be allocated, steps S35 to S39, which will be explained later, are skipped and the processing shifts to step S41.

On the other hand, when the route from the source node to the destination node can be formed by using the unused links in the slot "i" (step S33: Yes route), the evaluation value calculation unit 2015 identifies the shortest route among the routes from the source node to the destination node, which can be formed by using the unused links in the slot "i" (step S35). Specifically, the shortest route from the source node to the destination node is identified by the Dijkstra's algorithm by using the adjacency matrix generated from data stored in the link information storage 2005. Incidentally, this processing is the same processing as that described at the step S3, basically. However, in order to identify the shortest route formed by the unused links, Dijkstra's algorithm is used while assuming that the used links do not exist. Therefore, when the used links exist in the slot "i", "1" at a corresponding position in the adjacency matrix is replaced with "0". Then, the shortest route is identified by the Dijkstra's algorithm.

Then, the evaluation value calculation unit 2015 obtains the minimum number of hops for the combination to be processed from the hop data storage 2013, and judges whether or not the number of hops in the shortest route identified at the step S35 is greater than (the minimum number of hops+$\alpha$) (step S37). Incidentally, "the minimum number of hops+$\alpha$" represents the allowable number of hops, and at this step, it is judged whether or not the number of hops in the shortest route identified at the step S35 exceeds the allowable number of hops. "$\alpha$" is a predetermined value. When the number of hops in the shortest route identified at the step S35 is greater than (the minimum number of hops+$\alpha$) (step S37: Yes route), step S39 is skipped and the processing shifts to a processing at step S41. Incidentally, when the number of hops in the shortest route identified at the step S35 exceeds the allowable number of hops, the delay time becomes long when the packet transmission is carried out through such a route. Therefore, in this embodiment, the route whose delay time becomes long is not allocated.

On the other hand, when the number of hops in the shortest route identified at the step S35 is equal to or less than (the minimum number of hops+$\alpha$) (step S37: No route), the evaluation value calculation unit 2015 obtains the allocation priority for the combination to be processed from the priority storage 2003. In addition, the evaluation value calculation unit 2015 counts the number of used links in the slot "i" in the link information storage 2005. Specifically, in the column of the slot "i" in the link information storage 2005, the number of links to which "1" is set is counted.

Then, the evaluation value calculation unit 2015 calculates an evaluation value from the allocation priority, the number of hops in the shortest route identified at the step S35 and the number of used links in the slot "i" (step S39). Specifically, the evaluation value is calculated by a following expression.

Evaluation value=(an inverse of the allocation priority)* (the number of hops)*(the number of used links+1)

Incidentally, the calculated evaluation value is stored in the evaluation value storage 2017 in association with the source node, the destination node, and the slot "i" and the shortest route information.

Figure 17A:
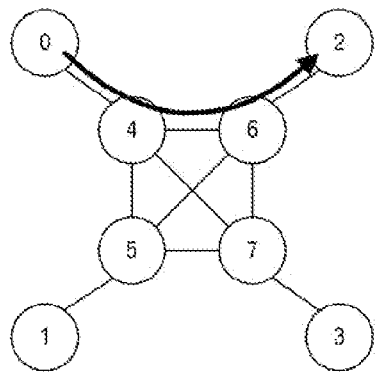
FIGS. 17A to 17C are diagrams to explain a specific calculation example of the evaluation value.

For example, a case where the route from the node "0" to the node "2" is being allocated to the slot "0" will be explained by using FIG. 17A. Here, it is assumed that a route "0->4->6->2" (the number of hops is "3") is identified at the step S35 as the shortest route. Incidentally, in this embodiment, the route is represented by the sequence of the node numbers. Then, in the priority storage 2003 (FIG. 7), the allocation priority corresponding to the combination of the source node "0" and the destination node "2" is "1". In addition, in the link information storage 2005 (FIG. 8), the number of used links in the slot "0" is "0". Therefore, the evaluation value in this case is calculated as follows: (1/1)*3*(0+1)=3. Incidentally, the source node "0", the destination node "2", the slot number "0", the route "0->4->6->2" and the evaluation value "3" are stored into the evaluation value storage 2017.

The aforementioned expression is a mere example, and another expression may be used. In the aforementioned expression, the higher the allocation priority is, the greater the evaluation value is, and the greater the number of hops is, the greater the evaluation value is, and the greater the number of used links is, the greater the evaluation value is. However, other expressions having the similar characteristic may be adopted. For example, the multiplication may be replaced with the addition. In addition, the elements (i.e. allocation priority, the number of hops and the number of used links) may be weighted.

Then, the evaluation value calculation unit 2015 judge whether or not the slot "i" is the last slot (namely, i=n), or the number of used links in the slot "i" is "0" (step S41). When the slot "i" is not the last slot and the number of used links in the slot "i" is not "0" (step S41: No route), the evaluation value calculation unit 2015 increments the variable "i" by "1" (step S43). After that, the processing returns to the step S33, and the aforementioned processing is repeated. Namely, the processing for the next slot is carried out.

On the other hand, when the slot "i" is the last slot or the number of used links in the slot "i" is 0 (step S41: Yes), the evaluation value calculation processing is completed and the processing returns to the calling source processing. Incidentally, because, in this embodiment, it is sequentially judged from the top time slot (i.e. time slot "0") whether or not the allocation is possible, when the number of used links in the slot "i" is "0", the number of used links in the next slot becomes "0". In such a case, even when the processing for the next slot is carried out, because all of the allocation priority, the number of hops and the number of used links become the same values, the calculated evaluation value becomes the same value. Therefore, in order to prevent from carrying out such calculation again, it is judged whether or not the number of used link in the slot "i" is "0", and when the number of used links in the slot "i" is "0", the evaluation value calculation processing is terminated. Thus, the processing load is reduced.

By carrying out the aforementioned processing, it is possible to calculate the evaluation taking into consideration the allocation priority, the number of hops and the number of used links.

Returning to the explanation of FIG. 14, after the evaluation value calculation processing (step S11) was carried out, the evaluation value calculation unit 2015 judges whether or not the combination to be processed is the last combination (step S13). For example, as described above, when the processing is carried out in ascending order of the node number of the source node, the combination of the source node "3" and the destination node "2" is the last combination. When the combination to be processed is the last combination (step S13:Yes route), the evaluation value calculation unit 2015 instructs the allocation determination unit 2019 to identify the maximum evaluation value. After that, the processing shifts to step S17 in FIG. 18 through a terminal A.

On the other hand, when the combination to be processed is the last combination (step S13: No route), the evaluation value calculation unit 2015 identifies a next combination as the processing target, according to the predetermined processing order (step S15). Then, the processing returns to the step S9. Namely, the aforementioned processing is repeated until all of the combinations have been processed in the predetermined processing order.

Figure 17B:
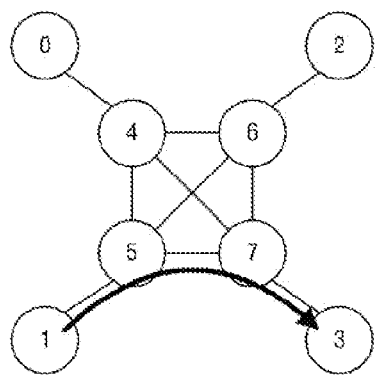

For example, when the combination of the source node "1" and the destination node "3" is identified as the processing target, the following evaluation value is calculated. Here, as depicted in FIG. 17B, it is assumed that the route "1->5->7->3" (the number of hops is "3") is identified as the shortest route at the step S35 (FIG. 16). Incidentally, the allocation priority corresponding to the combination of the source node "1" and the destination node "3" is "2". In addition, in the link information storage 2005 (FIG. 8), the number of used links in the slot "0" is "0". Therefore, the evaluation value in this case is calculated as follows: $(1/2)*3*(0+1)=1.5$. Incidentally, the source node "1", the destination node "3", the slot number "0", the route "1->5->7->3" and the evaluation value "1.5" are stored into the evaluation value storage 2017.

Figure 17C:
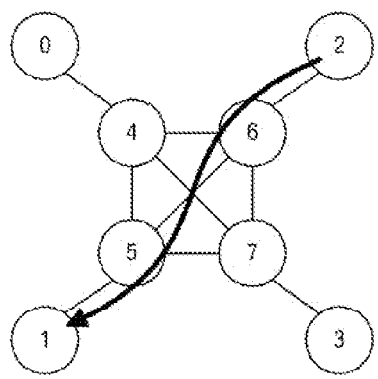

In addition, when the combination of the source node "2" and the destination node "1" is identified as the processing target, the following evaluation value is calculated. Here, as depicted in FIG. 17C, it is assumed that the route "2->6->5->1" (the number of hops is "3") is identified as the shortest route at the step S35 (FIG. 16). Incidentally, the allocation priority corresponding to the combination of the source node "2" and the destination node "1" is "3". In addition, in the link information storage 2005 (FIG. 8), the number of used links in the slot "0" is "0". Therefore, the evaluation value in this case is calculated as follows: $(1/3)*3*(0+1)=1$. Incidentally, the source node "2", the destination node "1", the slot number "0", the route "2->6->5->1" and the evaluation value "1" are stored into the evaluation value storage 2017.

Figure 18:
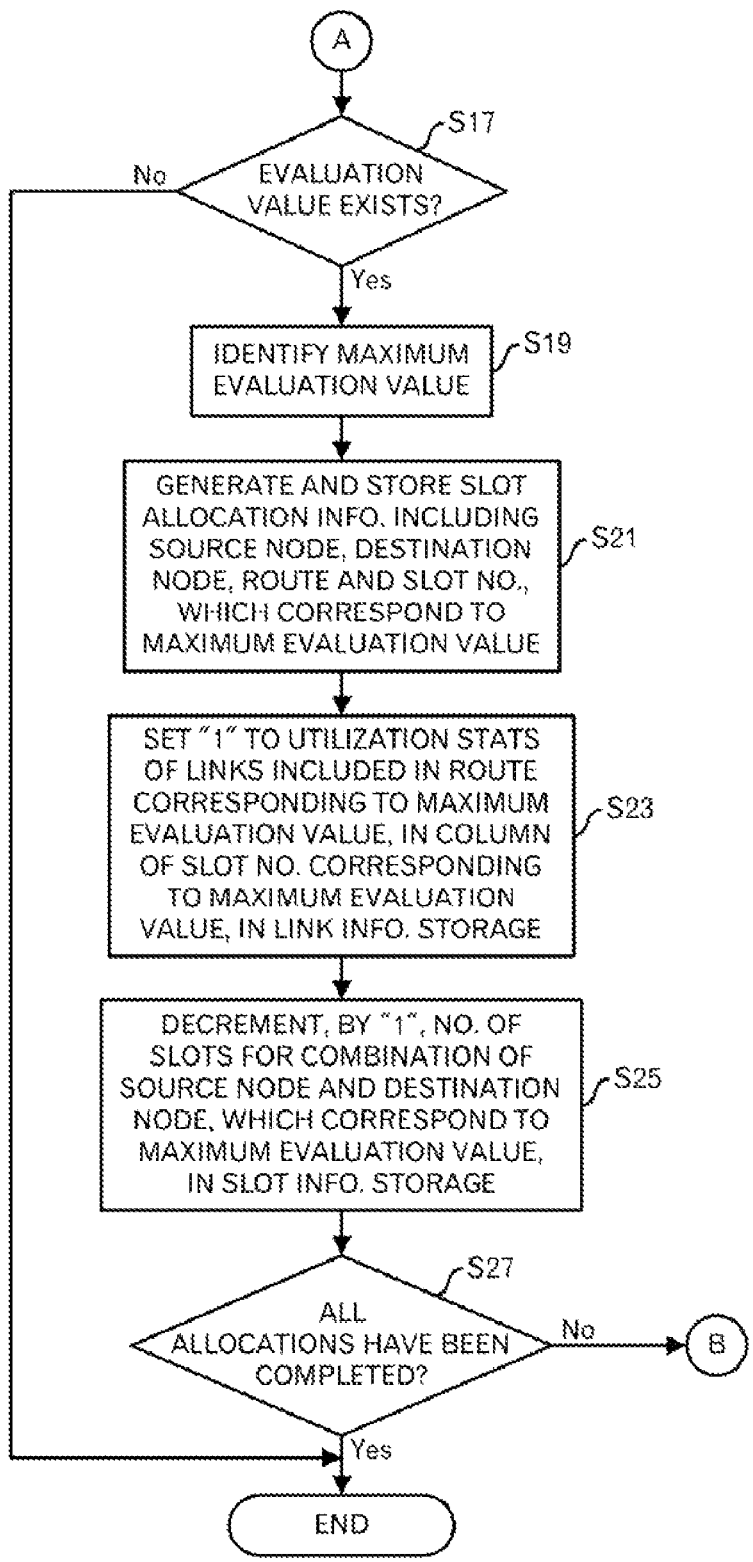
FIG. 18 is a diagram depicting a second portion of the processing flow when the time slot allocation is carried out.

Shifting to the explanation of FIG. 18, after the terminal A, the allocation determination unit 2019 judges whether or not the evaluation value is stored in the evaluation value storage 2017 (FIG. 18: step S17). When the evaluation value is not stored in the evaluation value storage 2017 (step S17: No route), there is no allocatable time slot. Therefore, steps S19 to S27 are skipped and the processing is terminated. Incidentally, when the evaluation value storage 2017 does not store any evaluation value, this means there is no time slot during which a route can be formed from the source node to the destination node.

On the other hand, when any evaluation value is stored in the evaluation value storage 2017 (step S17: Yes route), the allocation determination unit 2019 identifies the maximum evaluation value among the evaluation values stored in the evaluation value storage 2017 (step S19).

Then, the allocation determination unit 2019 extracts the source node, the destination node, the route information and the slot number, which correspond to the maximum evaluation value, from the evaluation value storage 2017. Then, the allocation determination unit 2019 generates slot allocation information including the extracted source node, destination node, route information and slot number, and stores the generated slot allocation information into the allocation information storage 2021 (step S21). For example, when data as depicted in FIG. 12 is stored into the evaluation value storage 2017 and the evaluation value "3" is identified as the maximum evaluation value, the slot allocation information including the source node "0", the destination node "2", the slot number "0" and the route "0->4->6->2", which correspond to the evaluation value "3", is generated and stored into the allocation information storage 2021. This means the slot "0" is allocated to the packet transmission from the node "0" to the node "2", and the route "0->4->6->2" is used as the transmission route.

Then, the allocation determination unit 2019 sets a value representing being used (i.e. "1") to the utilization states of the links included in the route corresponding to the maximum evaluation value in the column of the slot number corresponding to the maximum evaluation value, in the link information storage 2005 (step S23). For example, in case where the slot number "0" and the route "0->4->6->2" are extracted as the slot number and the route, which correspond to the maximum evaluation value, data as depicted in FIG. 19 is stored into the link information storage 2005 when the processing at the step is carried out. Compared with data depicted in FIG. 8, "1" is set to the column of the slot "0" for the link between the starting node "0" and the ending node "4", the link between the starting node "4" and the ending node "6" and the link between the starting node "6" and the ending node "2" in the link information storage 2005 in FIG. 19.

Figure 20:
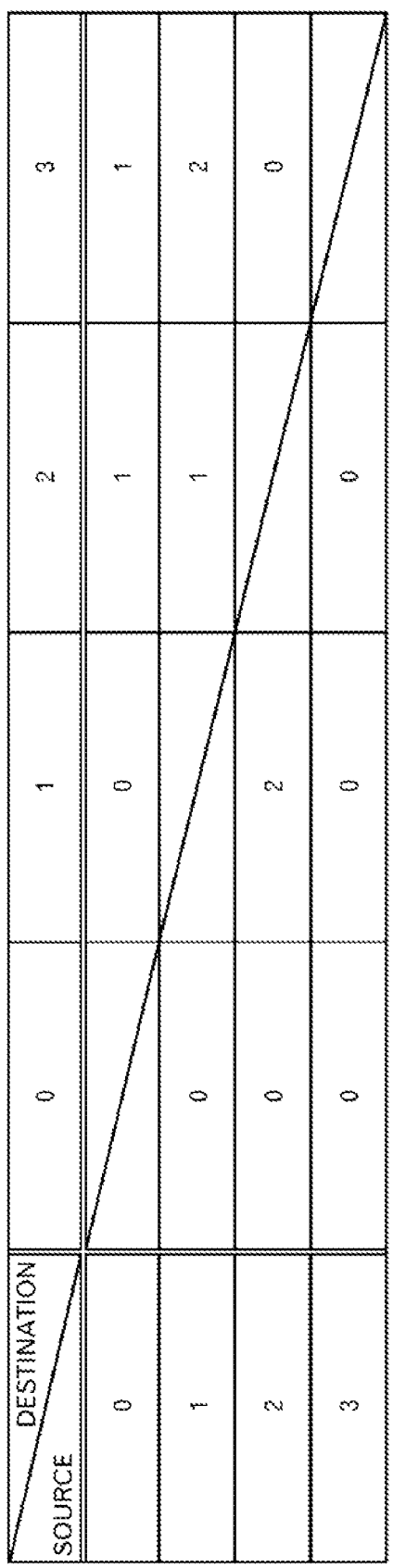
FIG. 20 is a diagram depicting an example of data stored in the slot information storage.

Then, the allocation determination unit 2019 decrements the number of slots for the combination of the source node and the destination node, which correspond to the maximum evaluation value, in the slot information storage 2009 by "1" (step S25). Namely, because a time slot is allocated to the packet transmission from the source node to the destination node at the aforementioned step S21, the corresponding number of slots in the slot information storage 2009 is decremented by "1". For example, when a time slot is allocated to the packet transmission from the source node "0" to the destination node "2", and the processing of this step is carried out, data as depicted in FIG. 20 is stored into the slot information storage 2009. Compare with data depicted in FIG. 10, the number of slots for the combination of the source node "0" and the destination node "2" becomes "1" in FIG. 20.

Then, the allocation determination unit 2019 judges whether or not the time slot allocation has been completed (step S27). Specifically, the allocation determination unit 2019 judges whether or not all of the numbers of slots, which are stored in the slot information storage 2009, become "0", and when all of the numbers of slots become "0", it is judged that the time slot allocation has been completed. When the time slot allocation has been completed (step S27: Yes route), the processing is completed.

On the other hand, when the time slot allocation has not been completed (step S27: No route), the processing returns to the step S5 in FIG. 14 through a terminal B, and the aforementioned processing is repeated. Incidentally, when the processing returns to the processing in FIG. 14 through the terminal B, data stored in the evaluation value storage 2017 is cleared at the step S7. Namely, when the time slot allocation for a certain route is carried out, the utilization state of the link is updated and the evaluation values are calculated again based on the latest states.

Figure 21:
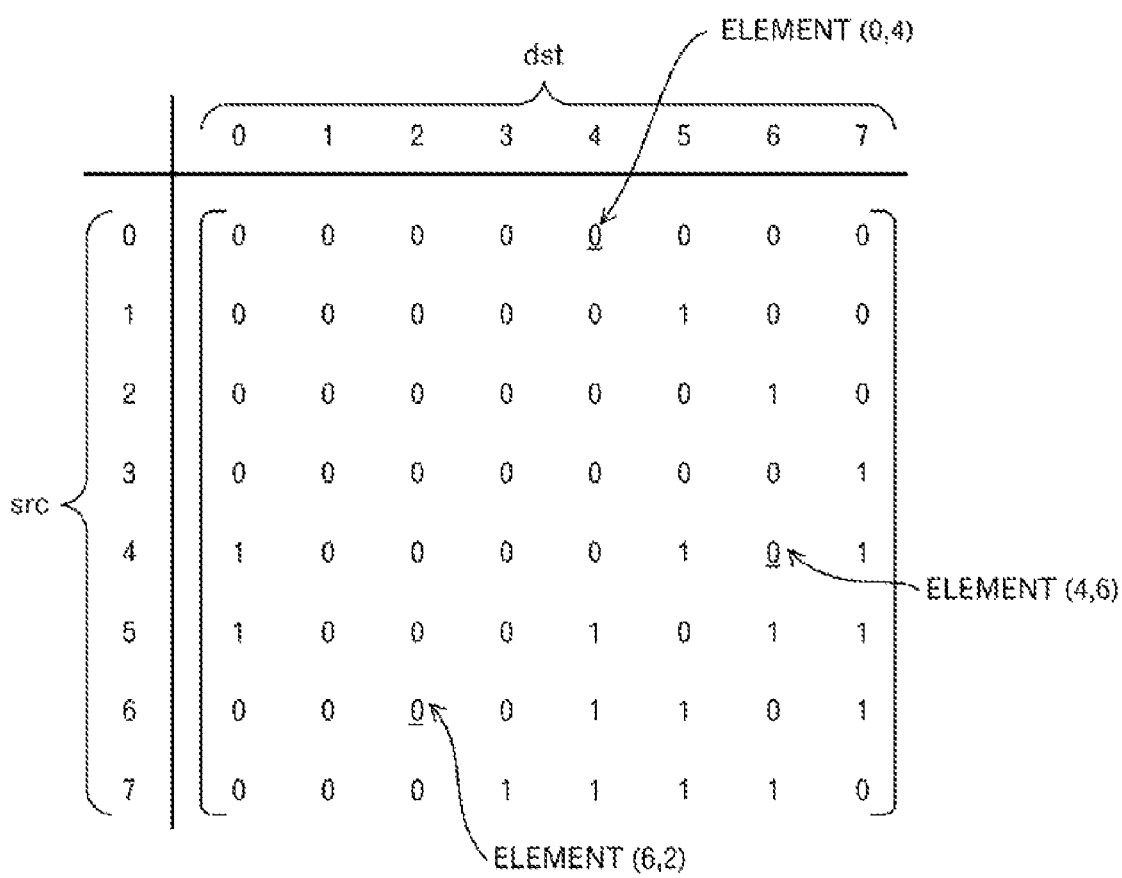
FIG. 21 is a diagram depicting an example of the adjacency matrix.

Incidentally, as described at the step S35 in FIG. 16, when there are used links in the slot "i", "1" is replaced with "0" at the corresponding position in the adjacency matrix. For example, when data as depicted in FIG. 19 is stored in the link information storage 2005 and the variable "i" is "0", the adjacency matrix depicted in FIG. 21 is generated at the step S35. Incidentally, as described above, "1" (i.e. "used") is set for the link between the starting node "0" and the ending node "4", the link between the starting node "4" and the ending node "6" and the link between the starting node "6" and the ending node "2" in FIG. 19. Therefore, "0" is respectively set to the elements (0, 4), (4, 6) and (6, 2) in the adjacency matrix depicted in FIG. 21.

By carrying out the aforementioned processing, it is possible to allocate the time slots according to the evaluation value taking into consideration the allocation priority, the number of hops required in the route from the source node to the destination node and the number of used links. For example, because the greater the number of hops required in the route from the source node to the destination node is, the greater the evaluation value is, the route with a large number of hops finally has higher priority than the route with a small number of hops. Furthermore, because the greater the number of used links is, the greater the evaluation value is, the time slot with a large number of used links is finally allocated with higher priority than the time slot with a small number of used links. Thus, it becomes possible to carry out the time slot allocation with little waste, and even when the number of routes for the packet communication increases, the packet communication can be realized with few time slots.

Figure 22:
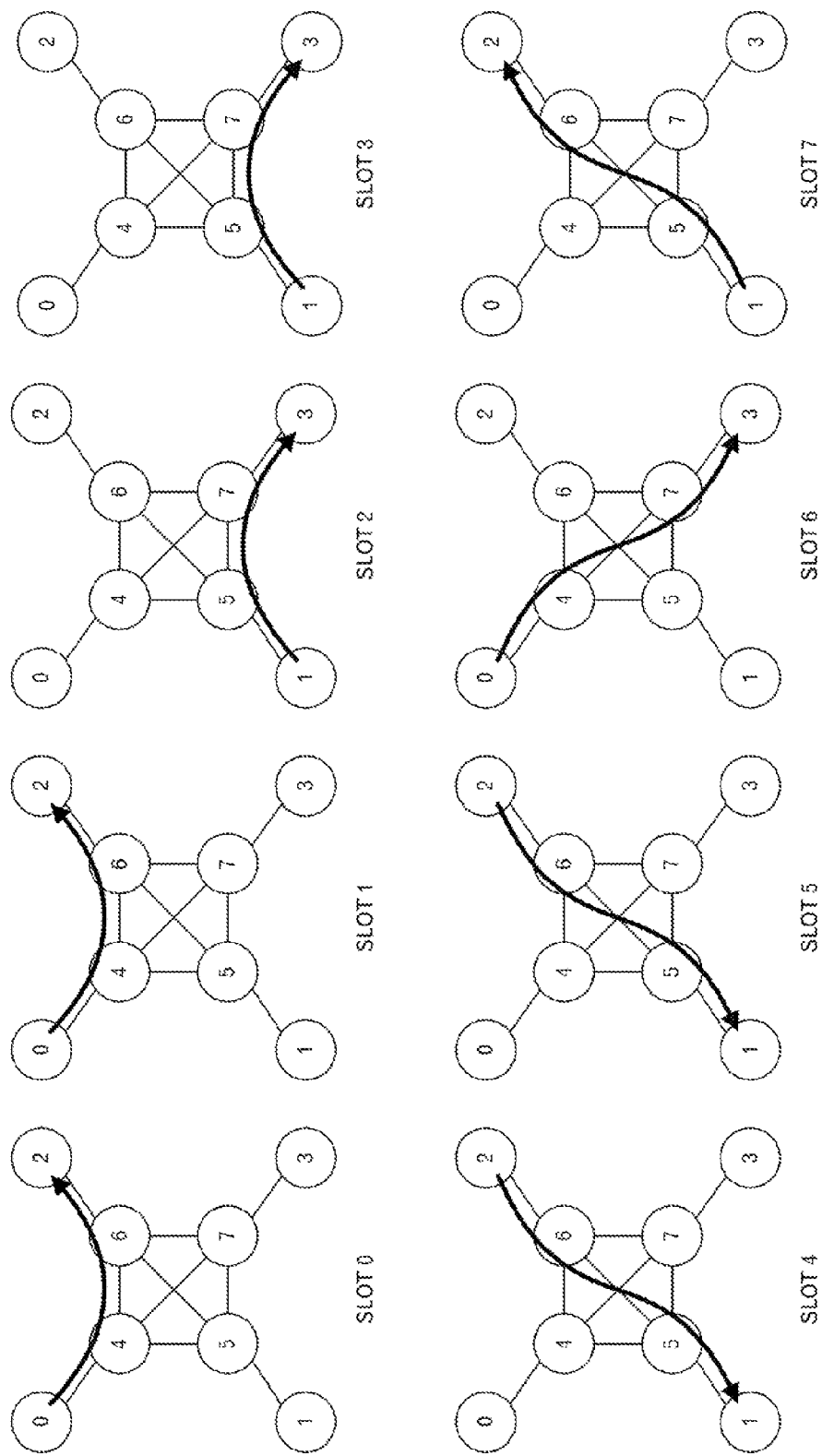
FIG. 22 is a diagram depicting an example in case where the time slots are allocated by the conventional art.

For example, the total number of slots in the slot information storage 2009 depicted in FIG. 10 is "8" (=2+1+1+2+2). Here, when one time slot is allocated to each of 8 routes, 8 time slots are required as depicted in FIG. 22. Incidentally, in FIG. 22, the packet transmission from the node "0" to the node "2" is allocated to each of the slots "0" and "1". In addition, the packet transmission from the node "1" to the node "3" is allocated to each of the slots "2" and "3". Furthermore, the packet transmission from the node "2" to the node "1" is allocated to each of the slots "4" and "5". In addition, the packet transmission from the node "0" to the node "3" is allocated to the slot "6". Furthermore, the packet transmission from the node "1" to the node "2" is allocated to the slot "7".

Figure 23:
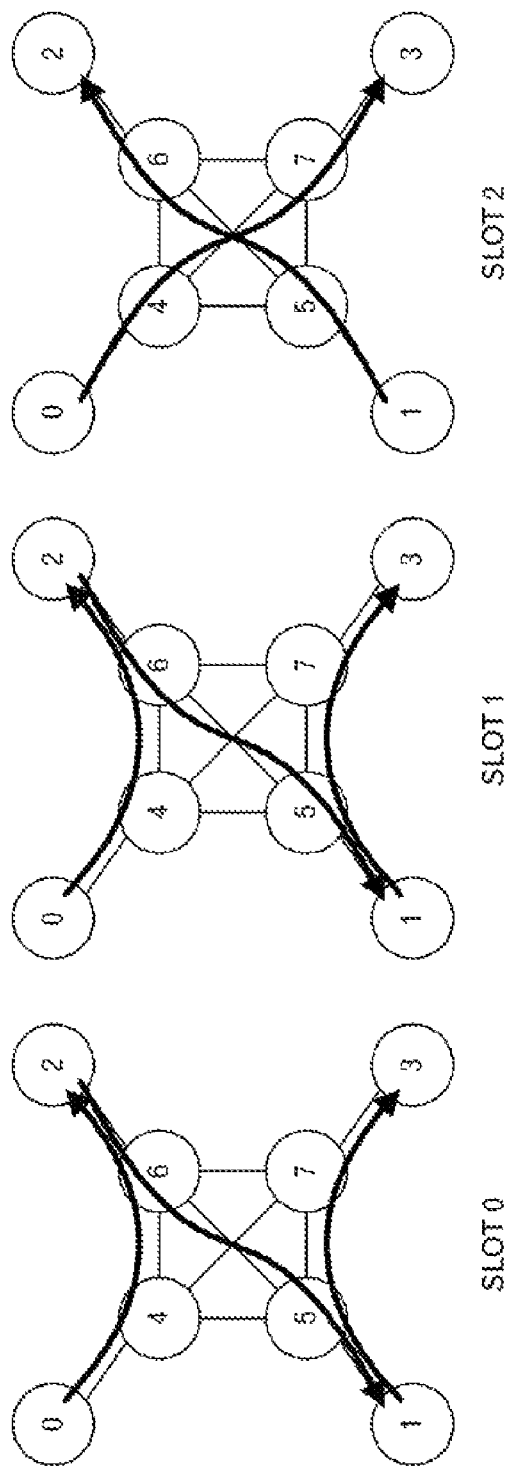
FIG. 23 is a diagram depicting an example of in case where the time slots are allocated by a method relating to this embodiment.

On the other hand, according to a method relating to this embodiment, only three time slots is used as depicted in FIG. 23. In FIG. 23, the packet transmission from the node "0" to the node "2", the packet transmission from the node "0" to the node "3" and the packet transmission from the node "2" to the node "1" are allocated to each of the slots "0" and "1". Incidentally, the link between nodes is divided into the uplink and downlink. Therefore, the packet transmission from the node "0" to the node "2" and the packet transmission from the node "2" to the node "1" have no collision even if the same time slot is used. Similarly, the packet transmission from the node "2" to the node "1" and the packet transmission from the node "1" to the node "3" have no collision even if the same time slot is used. In addition, in FIG. 23, the packet transmission from the node "0" to the node "3" and the packet transmission from the node "1" to the node "2" are allocated to the slot "2". Thus, according to this method relating to this embodiment, the required number of time slots can be reduced.

Incidentally, although a simple example of the network configuration was explained, it is possible to allocate the routes for the packet communication to a small number of time slots according to this embodiment, even when another network configuration is adopted.

Figure 24:
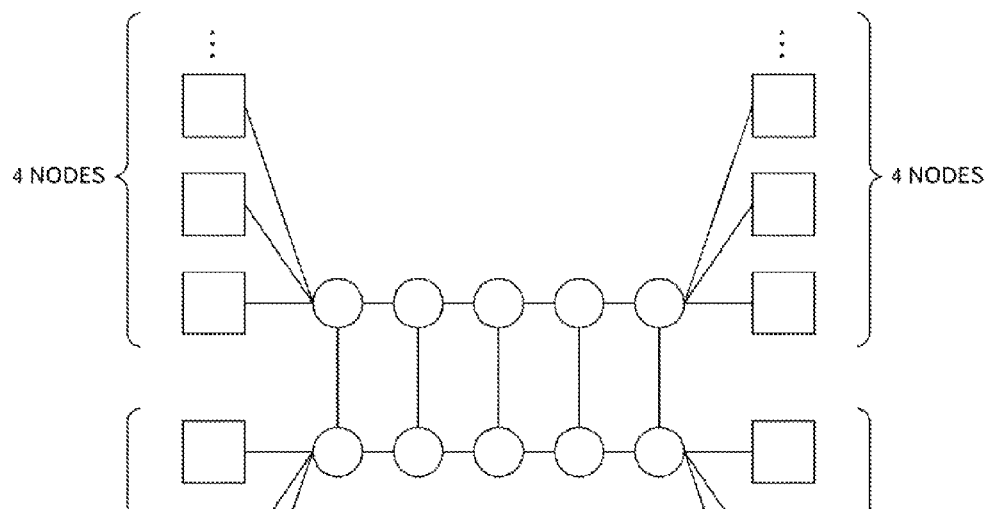
FIG. 24 is a diagram depicting a simulation result by the method relating to this embodiment.

For example, when simulation is carried out according to this embodiment in each of a tree-type network, a ladder-type network and a star-type network, simulation results depicted in FIG. 24 are obtained. Incidentally, FIG. 24 depicts simulation results in case where the source node and destination nodes are randomly selected and 64 routes are allocated in each of the networks as depicted in FIGS. 25 to 27.

FIG. 24 depicts a column of a type of network for which the simulation was carried out, a column of the total number of nodes including the edge routers and relay routers in each network, a column of the total number of edge routers in each network, a column of the conventional art, and a column of this method. The column of the conventional art indicates the number of slots in case where the time slot is allocated by the conventional art. Incidentally, the conventional art is a method for allocating one route per one time slot. Therefore, 64 slots are used for any one of the network configurations. In addition, the column of this method indicates the average number of time slots in case where the simulation is carried out five times according to the method of this embodiment.

Figure 25:
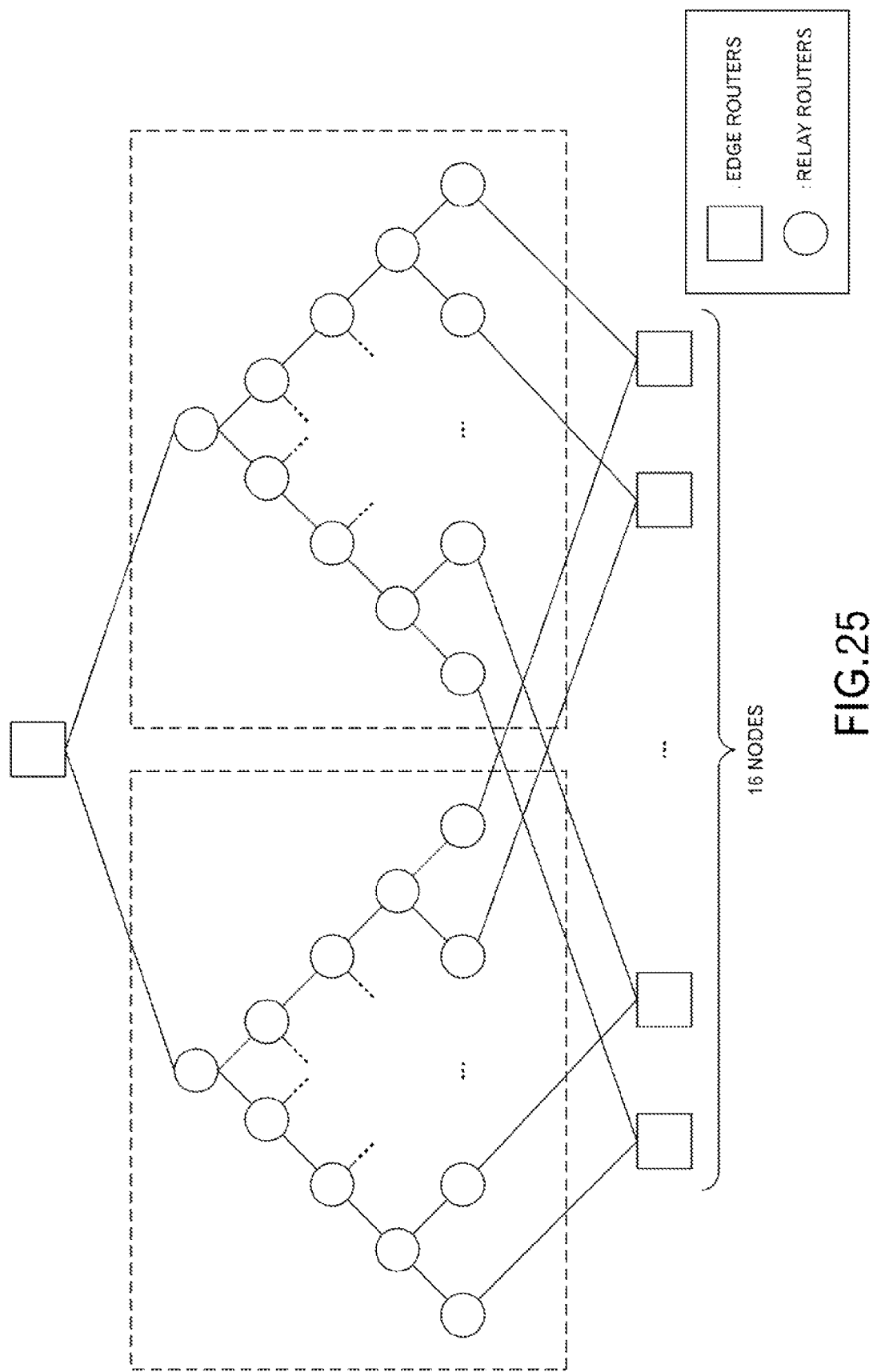
FIG. 25 is a diagram depicting a first network configuration (tree-type) at the simulation.

Incidentally, FIG. 25 depicts the tree-type network. The tree-type network depicted in FIG. 25 has 17 edge routers and 62 relay routers. In FIG. 25, a square represents an edge router, and a circle represents a relay router (also in FIGS. 26 and 27). In FIG. 25, there are two tree portions, and each tree portion includes 31 relay routers. In addition, a relay router that is a root node in the tree portion is connected with one edge router. Moreover, 16 relay routers that are leaf nodes in the tree portion are respectively connected to one of different edge routers. In the tree-type network as depicted in FIG. 25, 64 routes can be allocated to about 12.6 slots according to this embodiment.

Figure 26:
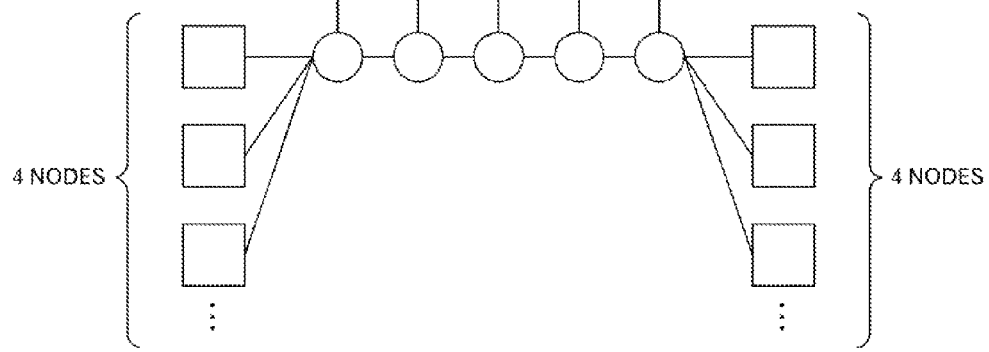
FIG. 26 is a diagram depicting a second network configuration (ladder-type) at the simulation.
Figure 26:
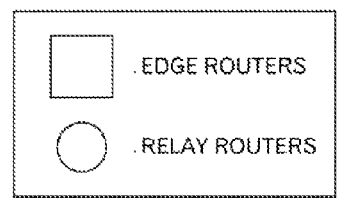
Figure 27:
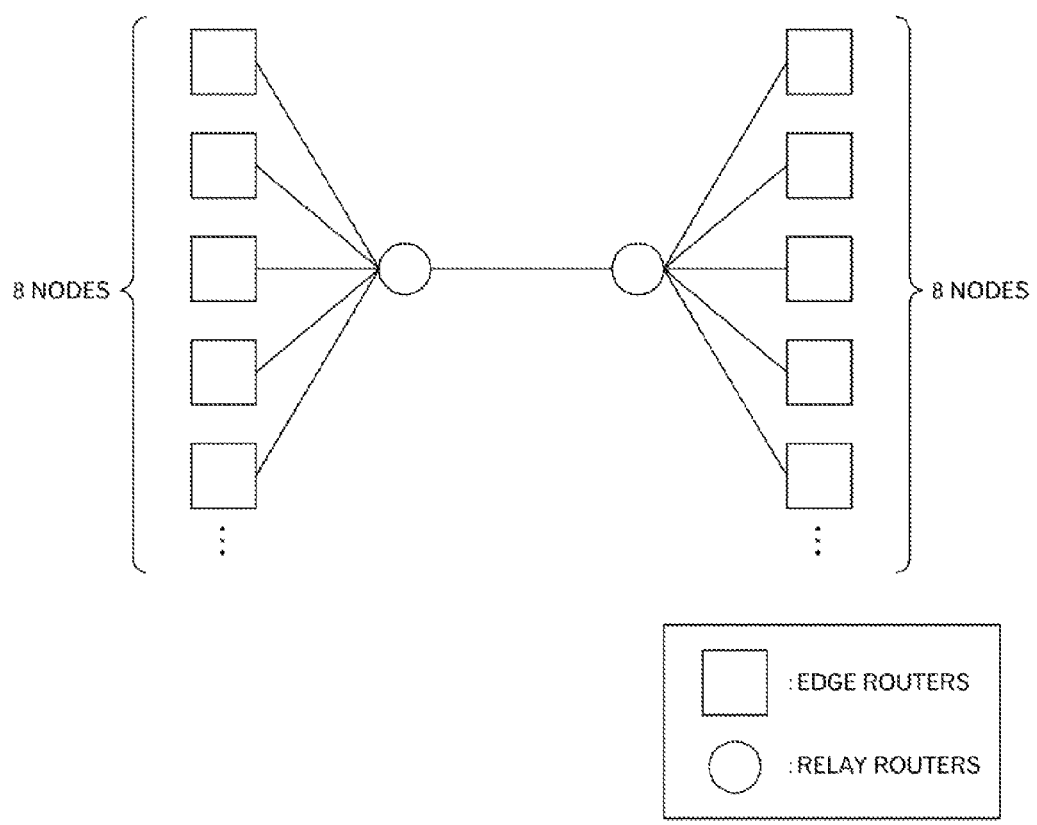
FIG. 27 is a diagram depicting a third network configuration (star-type) at the simulation.

In addition, FIG. 26 depicts a ladder-type network. The ladder-type network in FIG. 26 has 16 edge routers and 10 relay routers.

In FIG. 26, the relay routers are arranged in a form of 2*5 routers (i.e. vertical direction*horizontal direction) and adjacent relay routers in the vertical direction are connected with each other, and adjacent relay routers in the horizontal direction are connected with each other. In addition, each of the relay routers at the 4 corners is connected with four edge routers. In the ladder-type network as depicted in FIG. 26, 64 routes can be allocated to about 18.8 slots according to this embodiment. Incidentally, this is a simulation result in case where arbitrary 32 routes from the left-side edge router to the right-side edge router and arbitrary 32 routes from the right-side edge router to the left-side edge router are allocated in FIG. 26.

Furthermore, FIG. 27 depicts an example of the star-type network. The star-type network in FIG. 27 has 16 edge routers and 2 relay routers. In FIG. 26, the relay routers are connected with each other and each relay router is connected to 8 edge routers. In the star-type network as depicted in FIG. 27, 64 routes can be allocated to about 32 slots according to this embodiment.

Incidentally, this is a simulation result in case where arbitrary 32 routes from the left-side edge router to the right-side edge router and 32 arbitrary routes from the right-side edge router to the left-side edge router are allocated in FIG. 27. Incidentally, because, in the star-type network as depicted in FIG. 27, the number of links between the relay routers is less than that of other two networks, more slots are required. However, compared with the conventional art, the number of slots becomes half.

Although one embodiment of this technique is explained, this technique is not limited to this embodiment. For example, the aforementioned functional block diagram of the management server 200 does not always correspond to an actual program module configuration.

In addition, data stored in the aforementioned bandwidth information storage 2001, priority storage 2003, link information storage 2005, slot information storage 2009, hop data storage 2013, evaluation value storage 2017 and allocation information storage 2021 are mere examples, and the aforementioned data configuration is not always adopted. Furthermore, also in the processing flow, the order of the processing can be changed as long as the processing result does not change. Moreover, the steps may be executed in parallel as long as the processing result does not change.

Figure 30:
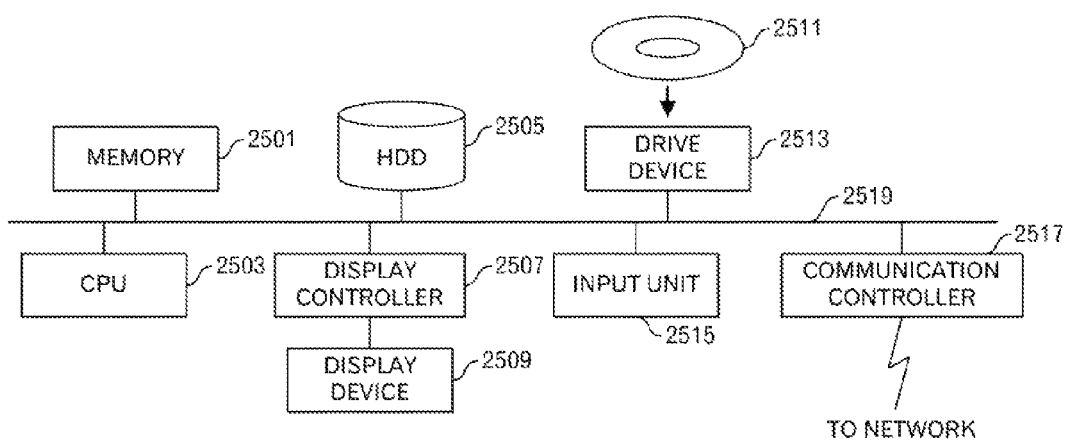
FIG. 30 is a functional block diagram of a computer.

In addition, the management server 200 is a computer device as shown in FIG. 30. That is, a memory 2501 (storage device), a CPU 2503 (processor), a hard disk drive (HDD) 2505, a display controller 2507 connected to a display device 2509, a drive device 2513 for a removable disk 2511, an input device 2515, and a communication controller 2517 for connection with a network are connected through a bus 2519 as shown in FIG. 30. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this invention, the application program to realize the aforementioned functions is stored in the removable disk 2511 and distributed, and then it is installed into the HDD 2505 from the drive device 2513. It maybe installed into the HDD 2505 via the network such as the Internet and the communication controller 2517. In the computer as stated above, the hardware such as the CPU 2503 and the memory 2501, the OS and the necessary application programs systematically cooperate with each other, so that various functions as described above in details are realized.

For example, when the hardware such as the CPU 2503 and the memory 2501 and the software such as OS and some application programs cooperate organically, function such as the aforementioned first calculation unit 2007, second calculation unit 2011, evaluation value calculation unit 2015, allocation determination unit 2019 and slot allocation unit 2023 are realized. In addition, data in the bandwidth information storage 2001, data in the priority storage 2003, data in the link information storage 2005, data in the slot information storage 2009, data in the hop data storage 2013, data in the evaluation value storage 2017 and data in the allocation information storage 2021 is stored in the memory 2501 or HDD 2505.

Figure 28:
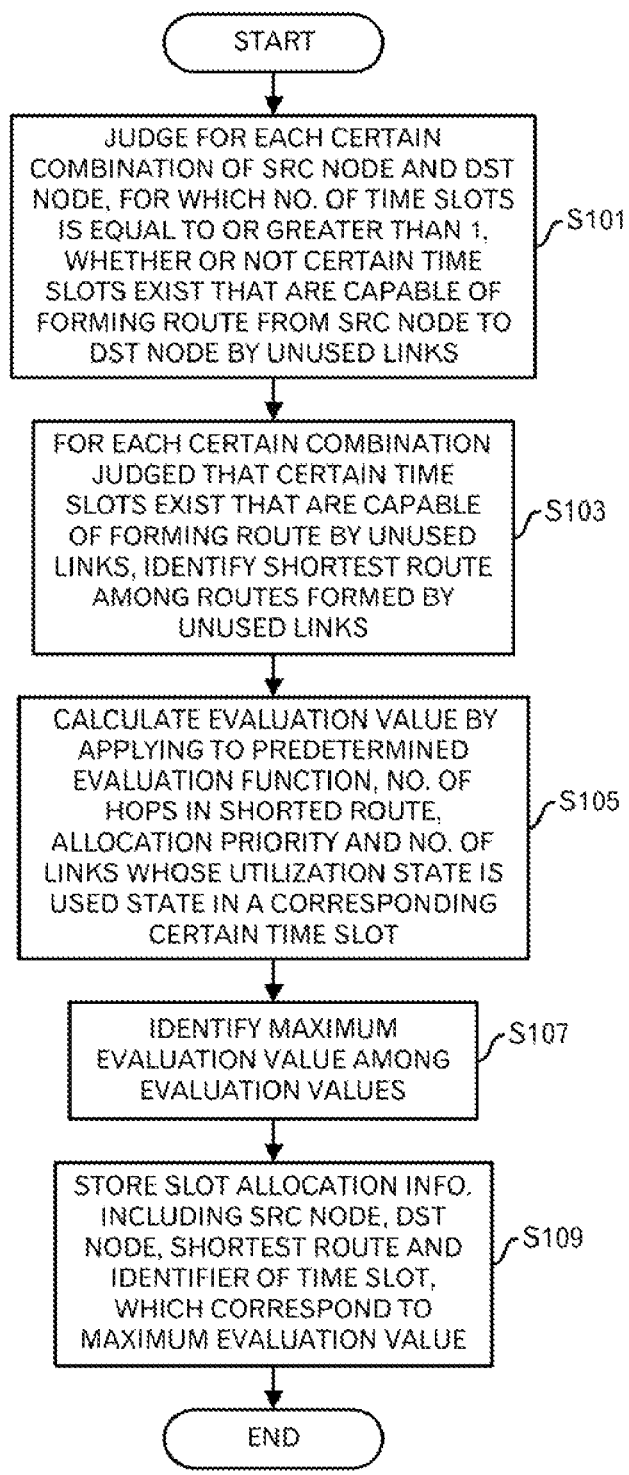
FIG. 28 is a diagram depicting a processing flow of a time slot allocation method relating to the embodiment.

The aforementioned embodiment of this technique is outlined as follows:

This time slot allocation method is a method executed by a computer, which is capable of accessing a slot information storage device storing, for each combination of a source node and a destination node in a network, a number of time slots to be allocated to packet transmission from the source node to the destination node, a priority storage device storing, for each combination, an allocation priority, a link information storage device storing, for each time slot, utilization states of links between nodes in the network, an allocation information storage device and a storage device. Then, the time slot allocation method includes: (A) (step S101 in FIG. 28) judging, for each certain combination of the source node and the destination node, for which the number of time slots stored in the slot information storage device is equal to or greater than 1, whether or not certain time slots exist that are capable of forming a route from the source node to the destination node by unused links for which the utilization state represents being unused in the link information storage device among the links between the nodes; (B) (steps S103 and S105 in FIG. 28) for each certain combination judged, at the judging, that the certain time slots exist that are capable of forming the route by the unused links, identifying, for each certain time slot, a shortest route among routs formed by the unused links, calculating an evaluation value by applying to a predetermined evaluation function, the number of hops in the shorted route, the allocated priority stored in association with a corresponding certain combination in the priority storage device and the number of links whose utilization state represents being used during a corresponding certain time slot in the link information storage device, and storing the calculated evaluation value into the storage device in association with the source node, the destination node, the shortest route and an identifier of the certain time slot; and (C) (steps S107 and S109 in FIG. 28) identifying a maximum evaluation value among the calculated evaluation values stored in the storage device, and storing into the allocation information storage device, slot allocation information including the source node, the destination node, the shortest route and the identifier of the certain time slot, which are stored in the storage device in association with the maximum evaluation value.

By carrying out such a processing, the evaluation value taking into account the allocation priority, the number of hops and the number of used links is calculated for each route for which the allocation is required and each of time slots allocatable to the route. Then, by allocating the time slots according to this evaluation value, it becomes possible to allocate the routes for which the allocation is required to a small number of time slots as much as possible. Namely, it becomes possible to efficiently allocate the routes to the time slots.

In addition, the aforementioned method may further include: decrementing, by 1, the number of slots for the combination of the source node and the destination node, which are associated with the maximum evaluation value, in the slot information storage device;

setting a value representing being used to the utilization states of links included in the shortest route associated with the maximum evaluation value in the time slot associated with the maximum evaluation value, in the link information storage device; and repeating the judging and subsequent processing until all of the numbers of slots, which are stored in the slot information storage device, become zero or until it is judged at the judging, for all remaining combinations of the source node and the destination node, that the certain time slots do not exist that are capable of forming the route by the unused links. Thus, when the allocation of the time slot to a certain route is carried out, a value representing being used is set to the utilization state of the links included in the certain route, and the evaluation value is recalculated. By doing so, it becomes possible to carry out the time slot allocation for routes for which the time slot allocation are required according to appropriate evaluation values.

Furthermore, the computer may be capable of further accessing a bandwidth information storage device storing, for each combination of the source node and the destination node, bandwidth for the packet transmission from the source node to the destination node. Then, before the judging, this method may include: calculating a greatest common divider of the bandwidths stored in the bandwidth information storage device; calculating, for each combination, a value used as the number of slots to be allocated, by dividing the bandwidth for the combination by the greatest common divider; and setting the calculated value into the slot information storage device in association with the combination.

By doing so, because the number of lots is calculated based on the greatest common divider of the bandwidths, it becomes possible to carry the time slot allocation with little waste.

In addition, the aforementioned computer may be capable of further accessing a hop data storage device storing, for each combination of the source node and the destination node, the minimum number of hops in a route from the source node to the destination node. Then, the aforementioned method may further include: judging whether or not a difference between the number of hops in the shortest route and the minimum number of hops for the combination is less than a predetermined value, and when it is judged that the difference is less than the predetermined value, the evaluation value is calculated for the combination. Thus, it can be realized to avoid, for example, the detour (namely, the bypass route causing the data propagation delay).

Furthermore, upon detecting that plural time slots exists in which all links between the nodes is unused, the evaluation value may be calculated for any one of the plural time slots in which all links between nodes is unused. For example, when plural time slots exist in which all links between the nodes are unused, all of the evaluation values become the same. Therefore, in order to omit the same calculation, the evaluation value is calculated once. Namely, it is possible to reduce the processing load.

In addition, the predetermined evaluation function may have at least one of a characteristic that the evaluation value increases when the allocation priority becomes higher, a characteristic that the evaluation value increases when the number of hops in the shortest route increases and a characteristic that the evaluation value increases when the number of links that is used in the time slot in the link information storage device increases. For example, when the evaluation function has a characteristic that the evaluation value increases when the number of hops in the shortest route increases, the route with a lot of hops has higher priority. Therefore, it becomes possible to efficiently carry out the allocation. For example, when the evaluation function has a characteristic that the evaluation value increases when the number of used links, the time slot, which has already been allocated, is selected with higher priority rather than unallocated time slot. Therefore, it becomes possible to carry out the allocation to one time slot with little waste.

Figure 29:
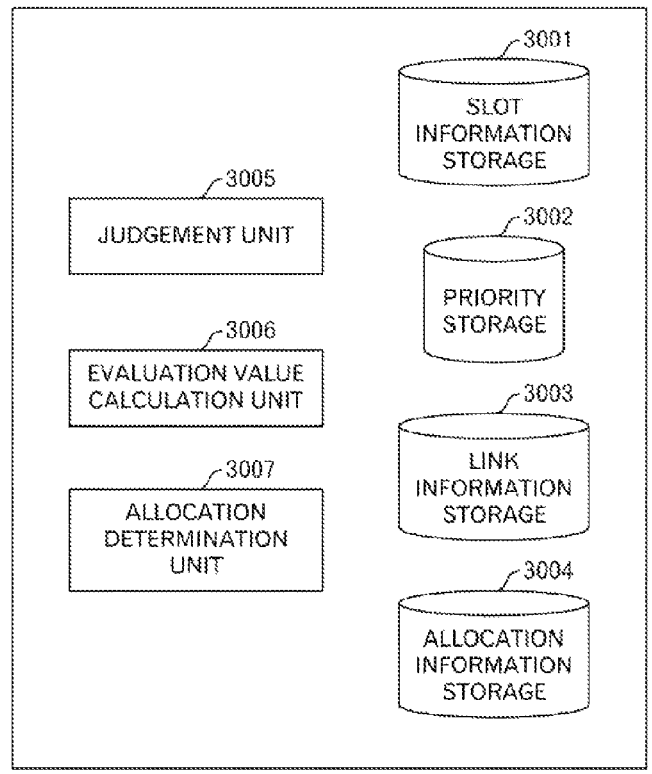
FIG. 29 is a functional block diagram of a time slot allocation apparatus relating to the embodiment.

A time slot allocation apparatus (e.g. the management server 200 in the embodiment), comprising: (A) a slot information storage device (3001 in FIG. 29) storing, for each combination of a source node and a destination node in a network, the number of time slots to be allocated to packet transmission from the source node to the destination node; a priority storage device (3002 in FIG. 29) storing, for each combination, an allocation priority; a link information storage device (3003 in FIG. 29) storing, for each time slot, utilization states of links between nodes in the network; a judging unit (3005 in FIG. 29) to judge, for each certain combination of the source node and the destination node, for which a number of time slots stored in the slot information storage device is equal to or greater than 1, whether or not certain time slots exist that are capable of forming a route from the source node to the destination node by unused links for which the utilization state represents being unused in the link information storage device among the links between the nodes; an evaluation value calculation unit (3006 in FIG. 29) to carry out a processing for each certain combination judged by judging unit that the certain time slots exist that are capable of forming the route by the unused links, to identify, for each certain time slot, a shortest route among routes formed by the unused links, to calculate an evaluation value by applying to a predetermined evaluation function, the number of hops in the shorted route, the allocation priority stored in association with a corresponding certain combination in the priority storage device and the number of links whose utilization state represents being used in a corresponding certain time slot in the link information storage device, and to store the calculated evaluation value into a storage device in association with the source node, the destination node, the shortest route and an identifier of the certain time slot; and an allocation determination unit (3007 in FIG. 29) to identify a maximum evaluation value among the calculated evaluation values stored in the storage device, and to store into an allocation information storage device (3004 in FIG. 29), slot allocation information including the source node, the destination node, the shortest route and the identifier of the certain time slot, which are stored in the storage device in association with the maximum evaluation value.

Incidentally, it is possible to create a program causing the management server 200 to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A time slot allocation method executed by a computer, wherein said computer is capable of accessing a slot information storage device storing, for each combination of a source node and a destination node in a network, a number of time slots to be allocated to packet transmission from the source node to the destination node, a priority storage device storing, for each said combination, an allocation priority, a link information storage device storing, for each said time slot, utilization states of links between nodes in said network, an allocation information storage device and a storage device, and said time slot allocation method comprising:
  judging, for each certain combination of the source node and the destination node, for which a number of time slots stored in said slot information storage device is equal to or greater than 1, whether or not certain time slots exist that are capable of forming a route from the source node to the destination node by unused links for which said utilization state represents being unused in said link information storage device among said links between said nodes;
  for each said certain combination judged, at said judging, that said certain time slots exist that are capable of forming said route by said unused links, identifying, for each said certain time slot, a shortest route among routes formed by said unused links, calculating an evaluation value by applying to a predetermined evaluation function, a number of hops in said shorted route, said allocation priority stored in association with a corresponding certain combination in said priority storage device and a number of links whose utilization state represents being used in a corresponding certain time slot in said link information storage device, and storing the calculated evaluation value into said storage device in association with the source node, the destination node, the shortest route and an identifier of the certain time slot; and
  identifying a maximum evaluation value among said calculated evaluation values stored in said storage device, and storing into said allocation information storage device, slot allocation information including the source node, the destination node, the shortest route and the identifier of the certain time slot, which are stored in said storage device in association with the maximum evaluation value.

2. The time slot allocation method as set forth in claim 1, further comprising:
decrementing, by 1, the number of slots for said combination of said source node and said destination node, which are associated with said maximum evaluation value, in said slot information storage device;
setting a value representing being used to the utilization states of links included in said shortest route associated with said maximum evaluation value in the time slot associated with said maximum evaluation value, in said link information storage device; and
repeating said judging and subsequent processing until all of the numbers of slots, which are stored in said slot information storage device, become zero or until it is judged at said judging, for all remaining combinations of said source node and said destination node, that said certain time slots do not exist that are capable of forming said route by said unused links.

3. The time slot allocation method as set forth in claim 1, wherein said computer is capable of further accessing a bandwidth information storage device storing, for each said combination of said source node and said destination node, bandwidth for the packet transmission from the source node to the destination node, and
said time slot allocation method further comprising:
before said judging, calculating a greatest common divider of said bandwidths stored in said bandwidth information storage device;
calculating, for each said combination, a value used as the number of slots to be allocated, by dividing the bandwidth for the combination by said greatest common divider; and
setting the calculated value into said slot information storage device in association with said combination.

4. The time slot allocation method as set forth in claim 1, wherein said computer is capable of further accessing a hop data storage device storing, for each said combination of said source node and said destination node, a minimum number of hops in a route from the source node to the destination node, and
said time slot allocation method further comprising:
judging whether or not a difference between a number of hops in the shortest route and said minimum number of hops for the combination is less than a predetermined value, and
when it is judged that said difference is less than said predetermined value, said evaluation value is calculated for the combination.

5. The time slot allocation method as set forth in claim 1, wherein, upon detecting that plural time slots exists in which all links between said nodes is unused, said evaluation value is calculated for any one of said plural time slots in which all links between nodes is unused.

6. The time slot allocation method as set forth in claim 1, wherein said predetermined evaluation function has at least one of a characteristic that said evaluation value increases when said allocation priority becomes higher, a characteristic that said evaluation value increases when a number of hops in the shortest route increases and a characteristic that said evaluation value increases when a number of links that is used in the time slot in said link information storage device increases.

7. A non-transitory computer-readable storage medium storing a program for causing a computer to execute a time slot allocation process, comprising:
judging, for each certain combination of a source node and a destination node, for which a number of time slots stored in a slot information storage device is equal to or greater than 1, whether or not certain time slots exist that are capable of forming a route from the source node to the destination node by unused links for which utilization state represents being unused in a link information storage device among links between nodes, wherein a slot information storage device stores, for each combination of the source node and the destination node in a network, a number of time slots to be allocated to packet transmission from the source node to the destination node, and a link information storage device stores, for each said time slot, utilization states of links between nodes in said network;
for each said certain combination judged, at said judging, that said certain time slots exist that are capable of forming said route by said unused links, identifying, for each said certain time slot, a shortest route among routes formed by said unused links, calculating an evaluation value by applying to a predetermined evaluation function, a number of hops in said shorted route, an allocation priority stored in association with a corresponding certain combination in a priority storage device and a number of links whose utilization state represents being used in a corresponding certain time slot in said link information storage device, and storing the calculated evaluation value into a storage device in association with the source node, the destination node, the shortest route and an identifier of the certain time slot, wherein a priority storage device stores, for each said combination of the source node to the destination node, an allocation priority;
identifying a maximum evaluation value among said calculated evaluation values stored in said storage device, and storing into an allocation information storage device, slot allocation information including the source node, the destination node, the shortest route and the identifier of the certain time slot, which are stored in said storage device in association with the maximum evaluation value.

8. A time slot allocation apparatus, comprising:
a slot information storage device storing, for each combination of a source node and a destination node in a network, a number of time slots to be allocated to packet transmission from the source node to the destination node;
a priority storage device storing, for each said combination, an allocation priority;
a link information storage device storing, for each said time slot, utilization states of links between nodes in said network;
a judging unit to judge, for each certain combination of the source node and the destination node, for which a number of time slots stored in said slot information storage device is equal to or greater than 1, whether or not certain time slots exist that are capable of forming a route from the source node to the destination node by unused links for which said utilization state represents being unused in said link information storage device among said links between said nodes;

an evaluation value calculation unit to carry out a processing for each said certain combination judged by judging unit that said certain time slots exist that are capable of forming said route by said unused links, to identify, for each said certain time slot, a shortest route among routes formed by said unused links, to calculate an evaluation value by applying to a predetermined evaluation function, a number of hops in said shorted route, said allocation priority stored in association with a corresponding certain combination in said priority storage device and a number of links whose utilization state represents being used in a corresponding certain time slot in said link information storage device, and to store the calculated evaluation value into a storage device in association with the source node, the destination node, the shortest route and an identifier of the certain time slot; and an allocation determination unit to identify a maximum evaluation value among said calculated evaluation values stored in said storage device, and to store into an allocation information storage device, slot allocation information including the source node, the destination node, the shortest route and the identifier of the certain time slot, which are stored in said storage device in association with the maximum evaluation value.

* * * * *